US012511427B1

(12) United States Patent
Venkat et al.

(10) Patent No.: US 12,511,427 B1
(45) Date of Patent: Dec. 30, 2025

(54) PROCESSING REQUESTS FOR PRIVATE DATA FROM UNAUTHENTICATED USERS

(71) Applicant: Morgan Stanley Services Group Inc., New York, NY (US)

(72) Inventors: Krithika Venkat, Edison, NJ (US); Jefferson Okraku, Jersey City, NJ (US); Rajalakshmi Gandhimohan, Alpharetta, GA (US); Sanjay K. Rout, Edison, NJ (US); Shyamal Padh, East Brunswick, NJ (US); Erisa Caka, Warren, MI (US); Yacine Aitsiselmi, London (GB); James Gough, Leicester (GB); Pradeep Sundaram, West Windsor, NJ (US); Naresh Guduri, Cranbury, NJ (US); Jodyann Carlucci, Katonah, NY (US)

(73) Assignee: Morgan Stanley Services Group Inc., New York, NY (US)

( * ) Notice: Subject to any disclaimer, the term of this patent is extended or adjusted under 35 U.S.C. 154(b) by 0 days.

(21) Appl. No.: 19/088,864

(22) Filed: Mar. 24, 2025

(51) Int. Cl.
*G06F 21/62* (2013.01)
*H04L 9/40* (2022.01)

(52) U.S. Cl.
CPC ........ *G06F 21/6227* (2013.01); *H04L 63/083* (2013.01); *H04L 63/20* (2013.01)

(58) Field of Classification Search
CPC ... G06F 21/6227; H04L 63/083; H04L 63/20; H04L 63/1425
See application file for complete search history.

(56) References Cited

U.S. PATENT DOCUMENTS

| | | | | |
|---|---|---|---|---|
| 12,020,255 | B1* | 6/2024 | Sahni | G06Q 20/4016 |
| 12,135,630 | B2* | 11/2024 | O'Dell | G06F 11/3608 |
| 2009/0158407 | A1* | 6/2009 | Nicodemus | H04L 63/20 |
| | | | | 726/6 |
| 2014/0136704 | A1* | 5/2014 | Yang | H04L 9/32 |
| | | | | 709/225 |
| 2015/0195268 | A1* | 7/2015 | Fang | H04L 9/3213 |
| | | | | 726/9 |
| 2018/0314622 | A1* | 11/2018 | Lowe | G06F 11/3616 |
| 2021/0264056 | A1 | 8/2021 | Irish et al. | |
| 2021/0288965 | A1* | 9/2021 | Afroz | G06F 21/6263 |
| 2021/0392170 | A1 | 12/2021 | Kakinada et al. | |

(Continued)

OTHER PUBLICATIONS

Yusup et al., "Advancing Passwordless Authentication: A Systematic Review of Methods, Challenges, and Future Directions for Secure User Identity," IEEE Access Year: 2025 | vol. 13 | Journal Article | Publisher: IEEE.*

(Continued)

*Primary Examiner* — Roderick Tolentino
(74) *Attorney, Agent, or Firm* — Duane Morris LLP

(57) ABSTRACT

Apparatus and corresponding methods for securely processing and responding to data requests, such as privacy data requests, in a distributed computing environment are disclosed. The embodiments can use various security policies to secure information and protect networks from malicious traffic, and can generate responses to legitimate data requests, such as unauthenticated data requests received through webpages. As such, the embodiments can provide privacy and security to distributed computing environments, among other advantages.

20 Claims, 10 Drawing Sheets

(56) References Cited

U.S. PATENT DOCUMENTS

| | | | |
|---|---|---|---|
| 2022/0038776 A1 | 2/2022 | Ghavami et al. | |
| 2022/0050921 A1 | 2/2022 | LaFever et al. | |
| 2022/0270725 A1 | 8/2022 | DeRosa-Grund | |
| 2022/0272111 A1 | 8/2022 | Rao et al. | |
| 2022/0300497 A1 | 9/2022 | Pansare et al. | |
| 2022/0358240 A1 | 11/2022 | Neal et al. | |
| 2022/0377093 A1 | 11/2022 | Crabtree et al. | |
| 2022/0398167 A1 | 12/2022 | Roche et al. | |
| 2023/0068788 A1 | 3/2023 | Thubert et al. | |
| 2023/0081166 A1 | 3/2023 | Codio et al. | |
| 2023/0185939 A1 | 6/2023 | Cam-Winget et al. | |
| 2023/0214398 A1 | 7/2023 | Kazmierczak et al. | |
| 2023/0252233 A1 | 8/2023 | Gutierrez et al. | |
| 2023/0297698 A1 | 9/2023 | Yerra | |
| 2023/0376628 A1 | 11/2023 | Baarsma et al. | |
| 2023/0409743 A1 | 12/2023 | Fennell et al. | |
| 2024/0160785 A1 | 5/2024 | Mustafa | |
| 2024/0195841 A1 | 6/2024 | Crabtree et al. | |
| 2024/0378614 A1* | 11/2024 | Bakshi | G06F 9/451 |
| 2024/0405972 A1* | 12/2024 | Kim | H04L 63/0846 |
| 2025/0193240 A1* | 6/2025 | Bishop | H04L 63/20 |

OTHER PUBLICATIONS

Kumar et al., "CloudShare: A Passwordless Cloud-Based File Storage and Sharing Framework," 2025 International Conference on Computing Technologies (ICOCT) Year: 2025 | Conference Paper | Publisher: IEEE.*

"Privacy Portal App," BigID, Retrieved: Mar. 24, 2025, https://bigid.com/privacy/privacy-portal-app/, 8 pages.

* cited by examiner

FIG. 2B

PROCESSING REQUESTS FOR PRIVATE DATA FROM UNAUTHENTICATED USERS

TECHNICAL FIELD

The present disclosure relates to networked computing systems and, more particularly, to computing devices configured to securely process requests for private data.

BACKGROUND

Many computer applications today are implemented by networked computing systems. For instance, the Internet allows users to use computing devices such as laptops, smart phones, and computers to access webpages. The webpages are hosted across various hosting devices, such as webpage hosting servers. Often times, however, the hosting devices receive malicious traffic, such as traffic attempting to bypass security measures, denial-of-service (DOS) attacks, protocol attacks, and application attacks, among others. The malicious traffic may be initiated by bad actors attempting to slow down or even disable the webpages and hosting devices. In some instances, the malicious attacks attempt to obtain private data, such as personal data (e.g., names, addresses, social security numbers, e-mail addresses, etc.). As such, these attacks not only increase the overall processing costs of the hosting servers, but can lead to the dissemination of private information to unauthorized persons. As such, there are opportunities to address security risks associated with networked computing systems.

SUMMARY

The appended claims may serve as a summary of the invention.

BRIEF DESCRIPTION OF THE DRAWINGS

Example embodiments will now be described by way of non-limiting examples with reference to the accompanying drawings, in which:

FIG. 2B illustrates an example privacy data request webpage, in accordance with some embodiments;

DETAILED DESCRIPTION OF CERTAIN EMBODIMENTS

Figure 1:
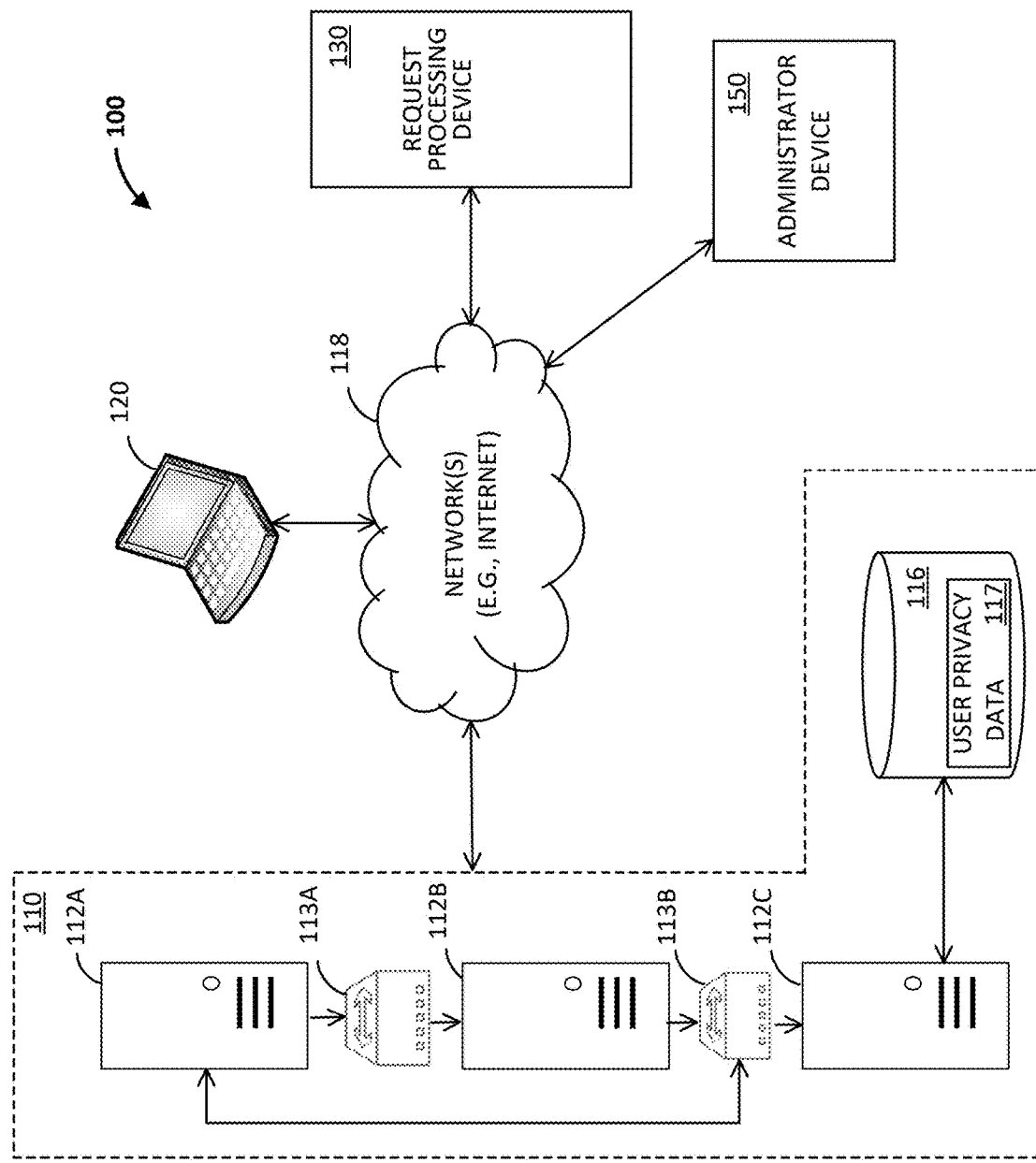
FIG. 1 illustrates an example networked computing system, in accordance with some embodiments.

In the following description, for the purposes of explanation, numerous specific details are set forth in order to provide a thorough understanding of the example embodiment(s) of the present invention. It will be apparent, however, that the example embodiment(s) may be practiced without these specific details. In other instances, well-known structures and devices may be shown in block diagram form in order to avoid unnecessarily obscuring the example embodiment(s).

1. General Overview

Apparatus and corresponding methods for securely processing and responding to data requests, such as privacy data requests, in a distributed computing environment are disclosed. The embodiments can secure information and protect networks from malicious traffic initiated by bad actors, and can generate responses to legitimate data requests, such as data requests received through webpages (e.g., a web portal) from unauthenticated users. As such, the embodiments can provide privacy and security to distributed computing environments, among other advantages.

In some embodiments, one or more processing devices are programmed to host a data request webpage (e.g., a web portal). For instance, the data request webpage can allow a user to input information, such as user information (e.g., name, address, social security number, e-mail address, etc.), and can allow for individual rights requests, such as those in compliance with corresponding privacy laws. These right requests can allow individuals to obtain personal information (e.g., Personally Identifiable Information (PII)), opt in or out of the selling of personal information, update personal information, and/or delete personal information, for example. The one or more processing devices can receive a webpage request (e.g., HTTP request) for the data request webpage. For instance, an executed browser on a user device can request the data request webpage (e.g., in response to the web location of the data request webpage being entered) and, in response, the one or more processing devices can load the data request webpage to the user device.

The one or more processing devices, however, does not maintain all of the content for the data request webpage. Instead, the one or more processing devices are programmed to request and receive static content for the data request webpage from a public network. For example, the one or more processing devices can transmit a request for static content for the data request webpage to an executed web application firewall (WAF) that can protect against various exploits and vulnerabilities, and if successful, send the request to an application gateway to follow a processing path to obtain the static content. In some examples, the request for static content is transmitted to a particular application programing interface (API), and/or using a particular formatting (e.g., password), encryption methodology (e.g., symmetric encryption, asymmetric encryption, hashing, etc.), and/or using any other security features. In some embodiments, the request can be subject to a corresponding set of control rules that allow or deny network traffic to or from the static content (e.g., Network Security Group (NSG) rules). The one or more processing devices are programmed to receive the static content from the public network in response to a successful request. As such, at least portions of the data request webpage are strategically kept secured from external traffic.

Once the static content is received, the one or more processing devices are programmed to provide the data request webpage for display. For example, based on the static content received, the one or more processing devices can transmit an HTTP Response characterizing the data request webpage. In some examples, the data request webpage includes one or more entry fields for user data. For example, the data request webpage can include one or more fields to enter one or more of a name, address, e-mail address, phone number, and social security number. A user can enter input data into one or more fields of the data request webpage as displayed by a user device and, in response, the user device can transmit the input data to the one or more processing devices. The input data may be considered unauthenticated when the user is unauthenticated. The one or more processing devices are programmed to receive the input data, and generate, using a first security policy, a privacy request message that includes the input data. As described herein, a security policy can require, among other things, that a message contain a specific structure or format, and/or specific data (e.g., a token, header data, etc.). In this example, the first security policy can be related to user device identities.

The one or more processing devices are programmed to transmit the privacy request message to a particular API using the first security policy. In some embodiments, the one or more processing devices are programmed to validate the privacy request message using a second security policy to obtain a validation result. As described herein, the second security policy can be related to API call formats. For example, the privacy request message can be successfully validated if it is received by an executed application via a particular API and in accordance with a specific API call format. In response to a successful validation, the privacy request message can be verified using a third security policy to obtain a verification result. The third security policy can be related to user request structures.

In response to a successful verification, the privacy request message can be processed by a system that supports the particular API in a private network. For example, the private network can be separated from the public network via a demilitarized zone (DMZ) gateway such that the private network is not accessible by the user device. The system can receive the privacy request message from the DMZ gateway, and can generate a response to the privacy request message. For example, the system can be programmed to read personal data (also referred to as privacy data) for the user from one or more storage devices. The privacy data can include, for example, PII. Further, the system can be programmed to generate a privacy response message that includes the personal data, and to transmit the privacy response message to the user device. For example, the privacy response message can be an e-mail (e.g., addressed to the e-mail address of the corresponding user).

In some embodiments, a computing system receives a first user request for specific data from a user device in a first network. The computing system examines the first user request using the first security policy related to user device identities to obtain an examination result. The computing system also identifies, in response to the examination result indicating a success, a first internal request for a call into a private API from the first user request. Further, the computing system validates the first internal request using the second security policy related to API calls to obtain a validation result. In addition, the computing device verifies, in response to the validation result indicating a success, the first internal request using the third security policy related to user request structures to obtain a verification result. Further, the computing system processes, in response to the verification result indicating a success, the first internal request in a second network different from the first network to generate a response message, where the second network is not directly reachable by the user device. In addition, the computing system transmits the response message to the user device.

The embodiments can provide various technical benefits. The segregation of a data processing pipeline into different zones corresponding to different security policies allows stability in security policies. The zone-based pipelining provides incremental and thus efficient and strong filtering of cyber threats from bad actors. Specifically, the customized segmentation of the system instead of a flat topology restricts the ability for lateral movement within the host network in case the host has been compromised. Therefore, the embodiments can provide a unique networked architecture that is designed to not only secure personal information such as PII, but also to protect a company's network from malicious traffic. Further, the embodiments can provide a webpage that can be access from external networks while at the same time being isolated from a company's internal network. Moreover, the embodiments can securely verify personal information request and, based on successful verification, can provide, add, or even edit personal information. The embodiments can, additionally or alternatively, reduce security risks and overall processing costs of a networked computing system. Persons of ordinary skill in the art may recognize these and other benefits as well.

2. Example Computing Environments

FIG. 1 illustrates a networked computing environment 100 that includes a request processing device 130, multiple networked processing devices 112A, 112B, 112C, a privacy data requesting device 150, and a user device 120 communicatively coupled over one or more networks 118 using one or more wired and/or wireless connections. In some examples, one or more of the multiple networked processing devices 112A, 112B, 112C are part of a cloud computing network 110. The request processing device 130 could be divided into multiple devices for implementing respective security policies. Each of the request processing device 130, multiple networked processing devices 112A, 112B, 112C, privacy data requesting device 150, and user device 120 can be, for example, a server, a laptop, a desktop computer, a tablet computer, or any other suitable computing device programmed to carry out the corresponding functions described herein. In addition, one or more of the multiple networked processing devices 112A, 112B, 112C can be connected to a database 116. In FIG. 1, the database 116 is communicatively coupled to the networked processing device 112C. The database 116 can be any suitable storage device (e.g., a network drive, cloud storage, etc.).

In at least some embodiments, the components of the cloud computing network 110 are part of a "private cluster" in a private network (e.g., including devices internal to a company), while the components that are not part of the cloud computing network 110 are part of a "public cluster" in a public network accessible to the public (e.g., including devices possibly managed by the company but without direct access to a company's private, internal network). In certain embodiments, the cloud computing network is implemented as a micro-segmented network managed by a cloud-based cluster management tool. The cloud computing network can adopt a default zero-trust policy. In other embodiments, the request processing device 130 can be part of the private cluster.

The network 118 can be implemented by any medium or mechanism that provides for the exchange of data between the various components of FIG. 1. Examples of the network 118 include, without limitation, one or more of a cellular network, a WiFi network, a near-field communication (NFC) network, a Local Area Network (LAN), a Wide Area Network (WAN), any Internet capable network, or any other suitable wired or wireless communication network.

In some embodiments, the system comprising the request processing device 130 and the networked processing devices are programmed to receive one or more user requests from the user device 120 for handling data associated with the user device 120 and managed by the system. The user device is considered to be associated with an unauthenticated user. The system is programmed to process these user requests through a data processing pipeline, which checks the request against multiple security policies before further processing associated calls into a private API in the networked processing devices and generating replies to the user requests. The administrator device 150, generally considered to be associated with an internal, authenticated user, can be programmed to facilitate management of the data processing pipeline.

3. Functional Descriptions
3.1. User Request Processing

In some examples, the request processing device 103 is programmed to receive a user request. The request processing device 130 is configured to execute a web application firewall (WAF) that protects web-based applications against various exploits and vulnerabilities. For instance, the WAF can detect and block malicious traffic, such as malicious bot traffic, preventing the malicious traffic from reaching a company's private network. In addition, any incoming user request would be processed through the WAF and, if not in violation of a first security policy associated with the WAF, would be allowed through for further processing. For example, the WAF can be a firewall that allows a single point of traffic entry, such as to the application gateway described below. The first security policy associated with the WAF can include, for example, denial-of-service (DOS) protection rules that limit the number of incoming user requests. The first security policy can further include ingress traffic restriction rules that limit ingress traffic to whitelisted HTTPS. If verification of the user identity or other checks performed by the WAF fail, the request processing device 130 can be programmed to reject the user request. For example, the request processing device 130 can be programmed to transmit an error message to the user device 120, and/or ignore (e.g., delete) the user request.

In some embodiments, the request processing device 130 is configured to route the user request using an application gateway to a processing path for a request for static content or a processing path for a request including a call into a private API. The derivation from a user request of an internal request for static content or an internal request including an API call can be performed before the application gateway (e.g., by a browser) or by the application gateway. For a user to have a privacy data request serviced by an organization, initially the user request received over a public network is typically a web request for the organization's entry webpage, where the privacy data request can be submitted. Subsequent user requests could correspond to web requests for different webpages hosted by the organization, for instance. Each webpage could include static content and/or can trigger one or more private API calls. The request processing device 130 can be programmed to generate corresponding internal requests using the application gateway, such as one for static content and one calling into an API. For example, the user request can be compared with an existing index of a static content repository or existing API documentation to determine what type of internal request to generate. The request processing device 130 can be programmed to then route the internal requests to appropriate processing paths in a data processing pipeline.

The request processing device 130 is configured (i.e., programmed) to host, in a local memory or a coupled storage device, one or more portions of webpages that are considered as static contents not subject to security restrictions, such as HTML language or icons in any of the privacy data request webpages described herein. For instance, the request processing device 130 can host portions of a privacy data request webpage (e.g., web portal) that allows for requesting, deleting, and/or editing personal information, such as PII. In response to identifying an internal request for static content in a webpage, the request processing device 130 is programmed to retrieve the corresponding webpage data (e.g., HTTP response) characterizing the hosted privacy data request webpage from the local memory or the coupled storage device. The request processing device 130 can also be configured to validate the internal request in terms of syntax or other known requests before retrieving the corresponding static content.

In some embodiments, the request processing device 130 is configured to generate unique tokens, such as cross-site request forgery tokens, to further protect web applications from malicious requests. The request processing device 130 can be configured to store the unique tokens or an association between the unique tokens and information identifying the user device 120 or the associated user. The unique tokens can be returned together with the static content to the user device 120. The user device 120 can be programmed to send the unique tokens together with future user requests to aid in user authentication.

In some embodiments, such as when the requested webpage includes only static content, the request processing device 130 is programmed to return the webpage using the retrieved static content. For example, the request processing device 130 can generate an HTTP Response that characterizes the privacy data request webpage using static content (e.g., only the static content). The request processing device 130 can be programmed to transmit the generated webpage data to the user device 120 for display (e.g., by the executed browser). When the requested webpage includes content to be generated using API calls, the request processing device 130 is programmed to perform additional operations to fully generate the webpage, as further discussed below.

As described herein, the privacy data request webpage includes various data fields for a requestor's information, such as a requestor's personal information (e.g., name, address, phone number, etc.). When data is entered and submitted (e.g., by hitting a "SUBMIT" icon), the user device 120 transmits another user request based on the input data to the request processing device 130. In response to receiving the user request, the request processing device 130 is programmed to similarly process the user request using the WAF under the first security policy. In response to determining compliance with the first security policy, the request processing device 130 can be programmed to determine that the user request triggers one or more calls to private APIs for accessing private, backend databases hosted in a private cluster, which can correspond to taking actions at different levels. For example, a higher-level API call can be to delete a user's private data from the system, while a lower-level API call can be to retrieve a user's social security number from a private database.

The request processing device 130 can be programmed to generate a corresponding internal request including one or more API calls. It is possible that the user request includes malicious content and thus an API call generated based on the malicious user request is invalid. Therefore, the request processing device 130 is programmed to further verify each API call to be processed using an application programming interface management (APIM) application under a second security policy. For example, under the second security policy, the APIM application can determine whether the API call is in accordance with a particular API specification for the private API for accessing private, backend databases, which can indicate a message structure, available endpoints, definitions for parameters and security schemes, and/or whether the API call includes at least certain portions of the data requested by the webpage (e.g., name and email address). The APIM application can also apply rate limiting to a given IP address. If verification of the API call or other checks performed by the APIM fail, the request processing device 130 can be programmed to reject the user request. For example, the request processing device 130 can be programmed to transmit an error message to the user device 120, and/or ignore (e.g., delete) the user request.

In some embodiments, under the second security policy, the APIM application is programmed to verify whether the user request includes one or more of the unique tokens. In response to determining that no tokens are included, or that one or more of the included tokens do not match the corresponding ones generated previously, the APIM application is programmed to reject the user request.

In some embodiments, in response to determining that an internal request, including an API call, is valid, the request processing device 130 is programmed to process the internal request using a DMZ gateway under a third security policy. The DMZ gateway can separate the public environment (e.g., devices connected to network 118) from the private environment (e.g., the private cloud computing network 110). The DMZ gateway can be programmed to provide additional firewall services and message validations. For example, the DMZ gateway can validate the content of user requests for a particular structure, which can be based on a previously presented Web form. Traffic that is not validated is rejected and cannot pass through to the private environment. In some examples, under the third security policy, the DMZ gateway requires that each request received from the APIM application include a particular token. In response to determining that the request does not include the particular token, or that the request does not include the particular token, the DMZ gateway is programmed to reject the user request.

In response to determining that the internal request complies with the third security policy, the request processing device 130 is programmed to transmit, using an API call, the internal request to the private cloud computing network 110. The networked processing device 112A, for instance, is programmed to receive the internal request, including the API call, from the request processing device 130, and process the internal request to execute the API call. In executing the API call, the networked processing device 112A is further programmed to determine a type of the internal request, and to perform one or more operations based on the type of internal request. The type of internal requests can include, for instance, requests to retrieve privacy information, requests to delete all or portions of privacy information, requests to edit privacy information, and requests to add to privacy information, among other examples.

For example, the internal request can be a request to retrieve personal information for the user. In this case, the networked processing device 112A can be programmed to compare input data received in the internal request to stored user data to determine if the input data matches with any of the stored user data. For instance, the networked processing device 112A can be programmed to compare a received name, address, and/or phone number to stored user information to determine if there is a match (e.g., the name, address, and phone number matching to the name, address, and phone number of a particular user's stored information). If the input data matches to a corresponding set of user data, the networked processing device 112A determines the input data is verified. Further, and based on the verification, the networked processing device 112A is configured to read privacy data from a storage device. For instance, the networked processing device 112A can read, from the database 116, user privacy data 117 corresponding to a user associated with the user device 120. In some examples, the networked processing device 112A is configured to determine whether each one of one or more storage devices (e.g., databases) include privacy information (e.g., PII) for the user. For instance, the networked processing device 112A can query each storage device with portions of the input data (e.g., name) to determine if a particular storage device likely includes privacy information for the user. For each storage device that likely includes privacy information for the user, the networked processing device 112A is programmed to retrieve candidate information from the storage device and perform further correlation, clustering, deduping, merging, or other operations to identify true matches.

In addition, the networked processing device 112A is configured to generate a privacy message that includes at least portions of the privacy data. As an example, the user privacy data 117 can include PII for the user. The networked processing device 112A can populate fields of a privacy message with the user privacy data 117. The privacy message can be, for example, an e-mail message addressed to an e-mail address of the user. The networked processing device 112A is further configured to transmit the privacy message to the user device 120.

For other types of user requests, such as to delete and/or edit privacy information, the networked processing device 112A can be programmed to perform corresponding operations (e.g., deleting privacy information from the storage devices, editing privacy information within the storage devices based on the input data), and to transmit an indication of whether the request was successful or not to the user device 120.

Figure 2A:
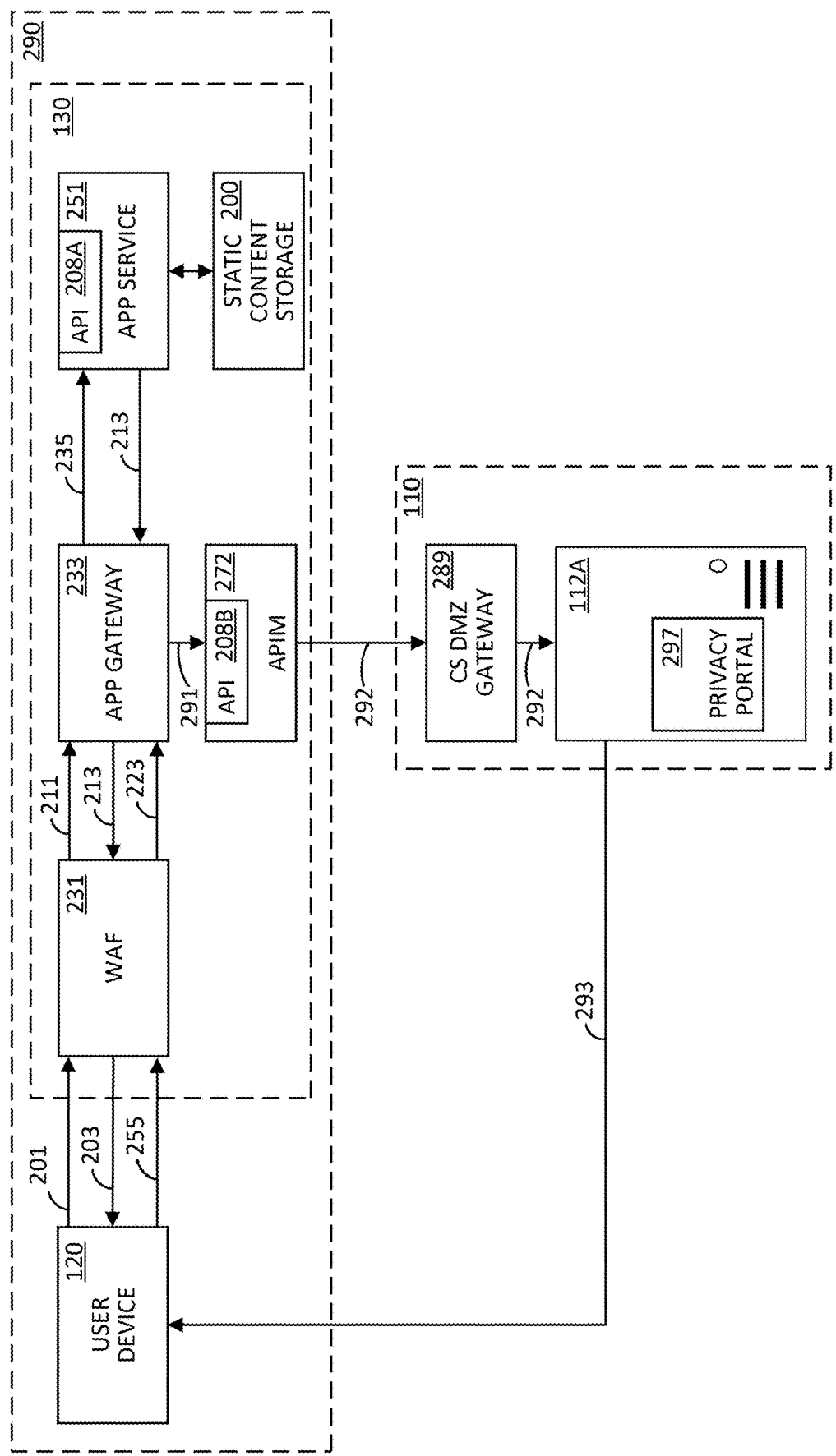
FIG. 2A illustrates example operations of the networked distribution computing system of FIG. 1, in accordance with some embodiments.

FIG. 2A illustrates example operations of the networked computing environment 100. In this example, a public network 290 includes the user device 120, a WAF 231, an application gateway 233, an APIM 272, an application service 251, and a static content storage device 200. Each of the WAF 231, application gateway 233, APIM 272, application service 251, and static content storage device 200 can be implemented by one or more processing devices, such as the request processing device 130. For example, the WAF 231, application gateway 233, APIM 272, and application service 251 can include program code executed by the request processing device 130. The networked computing environment 100 also includes the private cloud computing network 110, which in this example includes a cloud services (CS) DMZ gateway 289, and the networked processing device 112A.

As illustrated, the WAF 231 can receive a webpage request 201 from the user device 120. The webpage request 201 can be a request for access to a privacy request webpage. The WAF 231 can apply a first security policy to the webpage request 201 and, if successful, can further process the webpage request 201. For example, the WAF 231 can apply one or more DOS rules to the webpage request 201. If, for instance, the WAF 231 has received more than a predetermined number of requests over a prior temporal interval, the WAF 231 can reject the webpage request 201. Otherwise, the WAF 231 can accept the webpage request 201 and, in response, the WAF 231 generates and transmits a request for static content 211 to the application gateway 233. Based on the request for static content 211, the application gateway 233 is programmed to generate an API static content request 235, and transmit the API static content request 235 to the API 208A of the application service 251. For example, the API static content request 235 can be an API message transmitted to the API 208A and that includes, in particular data fields, data characterizing the request. In response to receiving the API static content request 235, the application service 251 obtains, from the static content storage device 200, the requested static content for the privacy request webpage.

Further, the application service 251 generates a static content response 213 that includes the obtained static content. The application service 251 transmits the static content response 213 to the WAF 231. The WAF 231 can be programmed to extract the static content from the static content response 213, and generate static content data 203 characterizing the requested privacy request webpage. For instance, the static content data 203 can be an HTTP Response (e.g., including HTML code) that can be received by a browser of the user device 120. The executed browser can process the HTTP Response to extract the static content, and display the static content as part of the privacy request webpage.

Figure 2B:
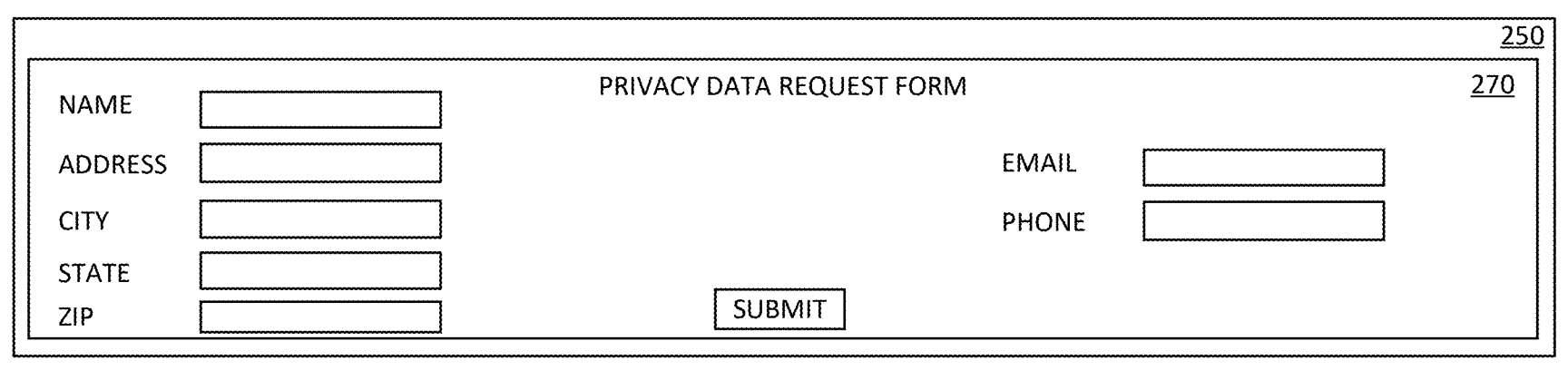

As described herein, the privacy request webpage can include fields for input data. For instance, FIG. 2B illustrates a privacy data request webpage 270 that can be displayed by the privacy data requesting device 150 (e.g., in response to receiving static content data 203). In this example, the privacy data request webpage 270 includes fields for entry of a name, address, city, state, zip code, email address, and phone number. It should be understood that these data entry fields are exemplary, and the privacy data request webpage 270 can, additionally or alternatively, include other data entry fields. The privacy data request webpage 270 also includes a "SUBMIT" icon to submit the entered data.

Referring back to FIG. 2A, a user can enter data (e.g., user data) into the fields of the privacy data webpage (e.g., the privacy data request webpage 270), and can select an icon, such as the "SUBMIT" icon described above, to submit the data entered into the various fields. In response to selecting the icon, the user device 120 generates an inputted data message 255 that includes the inputted data (e.g., unauthenticated input data), and transmits the inputted data message 255 to the WAF 231. As described herein, the WAF 231 can protect against various exploits and vulnerabilities. In these examples, the inputted data message 255 would be processed by the WAF 231 and, if not in violation of any of the WAF's 231 active policies and/or configurations, would be allowed through for further processing.

In this example, and in response to successfully verifying the inputted data message 255, the WAF 231 extracts the inputted data, and generates a first privacy data request message 223. The WAF 231 transmits the first privacy data request message 223 to the application gateway 233. The application gateway 233 receives the first privacy data request message 223, and is programmed to extract the inputted data from the first privacy data request message 223, and to generate an API privacy data request 291 in accordance with a second security policy expected by the API 208B of the APIM 272. For example, the application gateway 233 can include portions of the inputted data in predetermined and corresponding fields of the API privacy data request 291. The application gateway 233 then transmits the API privacy data request 291 to the API 208B of the APIM 272.

The APIM 272 receives the API privacy data request 291, and determines if the API privacy data request 291 allows the API privacy data request 291 to be further processed if it is received in accordance with the second security policy. If, for example, the API privacy data request 291 is not received in accordance with the second security policy, the APIM 272 disregards the request. Otherwise, if the API privacy data request 291 is received in accordance with the second security policy, the APIM 272 accepts the API privacy data request 291, and allows the API privacy data request 291 to be further processed.

In this example, the APIM 272 extracts the inputted data from the API privacy data request 291, and generates a second privacy data request message 292 that is in accordance with a third security policy. The third security policy can differ from the first security policy and from the second security policy. In this example, the third security policy include requirements for message structure. For instance, the third security policy can require that each received message include a particular header (e.g., message ID). Additionally or alternatively, the third security policy can require a particular token, and/or require that the API privacy data request 291 include at least certain portions of the data requested by the privacy request webpage (e.g., name and email address). The APIM 272 transmits the second privacy data request message 292 to the CS DMZ gateway 289.

The CS DMZ gateway 289 receives the second privacy data request message 292, and verifies that the second privacy data request message 292 is received in accordance with the third security policy. For example, as described herein, the CS DMZ gateway 289 can be programmed to determine that the second privacy data request message 292 includes a particular message structure, a token, and/or portions of data requested by the privacy request webpage. If the second privacy data request message 292 is not received in accordance with the third security policy (e.g., the second privacy data request message 292 does not include a particular message structure, a particular token, and/or particular portions of webpage data), the CS DMZ gateway 289 rejects (e.g., discards) the CS DMZ gateway 289. Otherwise, if the second privacy data request message 292 is received in accordance with the third security policy, the CS DMZ gateway 289 routes the second privacy data request message 292 to the privacy portal 297 of the networked processing device 112A.

In response to receiving the second privacy data request message 292 via the privacy portal 297, the networked processing device 112A extracts the inputted data from the second privacy data request message 292. Further, the networked processing device 112A can verify the inputted data is for a valid user. For instance, the networked processing device 112A can compare the inputted data to the user privacy data 117 for various users stored in database 116. If the inputted data matches to at least portions of user privacy data 117 for a user, the networked processing device 112A considers the inputted data verified. For instance, to verify the inputted data, the networked processing device 112A can require that a number of data entries (e.g., name, address, social security number) characterized by the inputted data match user privacy data 117 for a user. In some examples, the networked processing device 112A can apply one or more algorithms or rules to the inputted data and the user privacy data 117 of a user to determine whether the inputted data is verified to a particular use.

If the inputted data does not verify, the networked processing device 112A can ignore the second privacy data request message 292 and discard (e.g., delete) the inputted data or return an error. If, however, the inputted data can be verified against user privacy data 117 for a particular user, the networked processing device 112A generates a privacy data response message 243, such as an e-mail message. The privacy data response message 243 includes at least portions of the user privacy data 117 for the verified user. For instance, the privacy data response message 243 can include PII for the user. The networked processing device 112A transmits the privacy data response message 243, which can be received and displayed by the user device 120. For instance, the networked processing device 112A can address the privacy data response message 243 to an e-mail address of the verified user, and can e-mail the privacy data response message 243. An e-mail application executed by the user device 120 can, for example, display the privacy data response message 243.

In some examples, as described further herein, the networked processing device 112A can generate the privacy data response message 243 to include an activation link. The networked processing device 112A transmits the privacy data response message 243 addressed to the e-mail address of the verified user. The user device 120 can receive the privacy data response message 243 email and a selection of the activation link, which causes the generation of a new user request as a privacy request activation message. The request processing device 130 is programmed to process this new user request through the same data processing pipeline, as noted above and further discussed below. As a result of that processing, when the result of processing the original privacy data request is ready, the networked processing device 112A can transmit a passcode message to the e-mail address of the user that includes the passcode. The user device 120 can then send the passcode back as a second new user request. The request processing device 130 is programmed to process this new user request through the same data processing pipeline, as noted above and further discussed below. As a result of that processing, the networked processing device 112A can transmit a response to the second new user request, which can include a result of processing the initial privacy data request (e.g., successful unsuccessful), for display by the user device 120.

Figure 4:
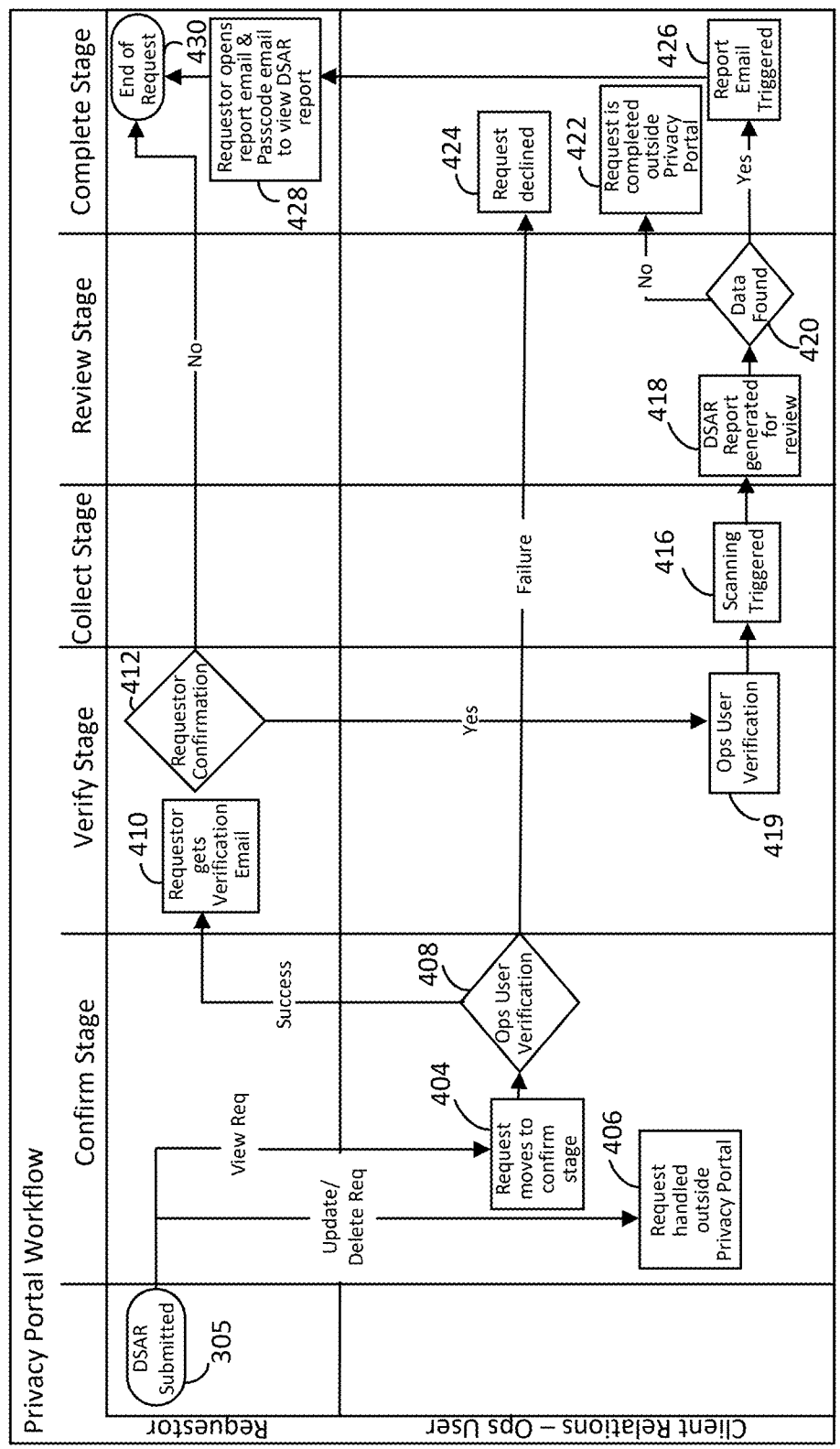
FIG. 4 illustrates example privacy data request verification and report generation operations, in accordance with some embodiments.

FIG. 4 illustrates example privacy data request verification and report generation operations, such as those that can be carried out by the network processing device 112A executing, for instance, the privacy portal 297. As illustrated, FIG. 4 illustrates processing operations in each of a Confirm Stage, Verify Stage, Collect Stage, Review Stage, and Complete Stage.

Referring to FIG. 4, a data subject access request (DSAR) or a privacy data request 305 is received and, based on the privacy data request 305 (e.g., based on a message type field of a message header), a determination is made as to whether the privacy data request 305 is to view or update (including adding and/or deleting), privacy data. When the privacy data request 305 is to update and/or delete privacy data of a user, at block 406 the privacy data request 305 is transmitted from the executed privacy portal 397 to, for instance, an executing application that is responsible for updating and/or deleting privacy data within a memory device (e.g., user privacy data 117 stored within database 116). Otherwise, if the privacy data request 305 is requesting viewing privacy data of a user, at block 404, the request moves to the Confirm Stage where, at block 408, the administrator device 150 is programmed to begin a verification process of the privacy data request 305. For example, the administrator device 150 and can initiate a flow to further verify the user-provided data, including transmitting an email with an activation link to the user's email address. The administrator device 150 can also provide the privacy data request 305 for display for human validation.

If, at block 408, an email address cannot be located for the user (e.g., the email address provided in the privacy data request 305 is invalid or the privacy data request 305 does not include an email address for the user), the request is denied at block 424 at the Complete Stage. For instance, the privacy data request 305 can be ignored, or an error message (e.g., email) can be transmitted to the requesting user.

If, however, an email address is successfully located for the user, at block 410 in the Verify Stage a verification email is generated and transmitted to the requesting user device 120. The verification email can include a selectable activation link that, if selected, causes the generation of a privacy request activation message that indicates the selection of the activation link. The requesting user's email address can be verified based on receiving the privacy request activation message. If the requesting user fails to verify the requesting user's email address (e.g., the activation link is not selected within a predetermined amount of time), the request is terminated at block 430 in the Complete Stage. If, however, the requesting user successfully verifies the requesting user's email address, at block 419 further verification operations are performed. For example, the administrator device 150 can determine whether the user, based on the user's email address and/or other user information, is on a high-risk list. Further, the administrator device 150 can deny the privacy data request 305 (e.g., by transmitting an error message in response to the privacy data request 305) when the user is on the high-risk list, or allow the privacy data request 305 when the user is not on the high-risk list.

When the verification operations at block 419 are complete, scanning, in the Collect Stage at block 416, is initiated. During the scanning operations, various databases are scanned for privacy data for the requesting user. Once the privacy data is collected from the various databases, a privacy data report is generated in the Review Stage at block 418. The privacy data report can include the privacy data collected from the various databases, if any was obtained. If, at block 420, the privacy data report does not include any privacy data, at block 422 in the Complete Stage the privacy data request 305 is provided to another executing application that, for instance, can perform operations to determine if there was is an error in the privacy data request 305, or whether no privacy data is being held for the requesting user.

If, however, at block 420 the privacy data report does include privacy data, a privacy data reporting message is generated at block 426 in the Complete Stage. The privacy data reporting message can be an email address to the requesting user's email address. The privacy data reporting message can include the privacy data report. For instance, the privacy data report can be encrypted and included in the privacy data reporting message. The privacy data reporting message is then transmitted to the requesting user. At block 428, the user opens the privacy data reporting message and views the privacy data report. The request then terminates at block 430.

In some examples, the privacy data report is encrypted based on a passcode (e.g., a random passcode). In addition to the privacy data reporting message, a privacy passcode message can be generated, where the privacy passcode message includes the passcode. The privacy data reporting message and the privacy passcode message can be transmitted to the requesting user. The user can open the privacy passcode message, and obtain the privacy passcode. The user can then open the privacy data reporting message, and cause the privacy data report to be unencrypted based on the passcode. For example, the user can select the privacy data report, and in response, a passcode input icon is displayed. To access the privacy data report, the user must enter the correct privacy passcode, which is the privacy passcode that was transmitted in the privacy passcode message. If the entered privacy pass code matches the expected privacy passcode, the user is able to view the privacy data report. The request then terminates at block 430.

3.2. Data Processing Pipeline

Figure 3:
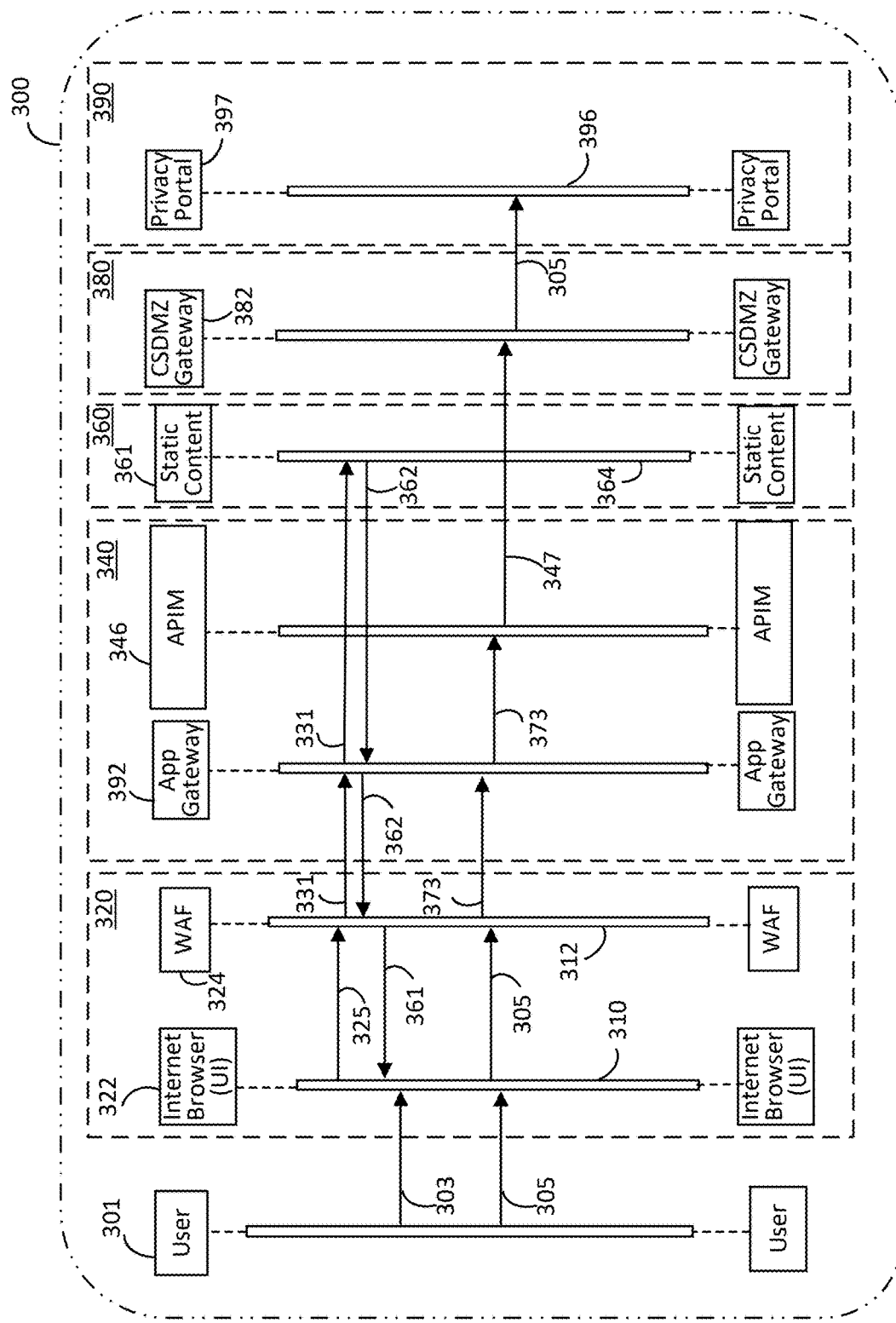
FIG. 3 illustrates example messaging within a networked computing system, in accordance with some embodiments.

FIG. 3 illustrates example messaging within a networked computing system 300. As illustrated, the networked computing system 300 is partitioned into various "zones" including a first zone 320, a second zone 340, a third zone 360, a fourth zone 380, and a fifth zone 390. The combination of zones can be implemented by one or more devices. Each zone can be subject to corresponding access and/or security policies, as described further below. For instance, in some examples, the first zone 320 is external to a company's network, while the remaining zones are internal to a company's network. In other examples, each of the first zone 320, second zone 340, and the third zone are external to a company's private network, while the fifth zone is internal to a company's network.

As illustrated, the first zone 320 includes an internet browser executed by a user device 310 (e.g., user device 120), as well as a WAF 324 executed by a hosting device 312 (e.g., request processing device 130). The second zone 340 includes an application gateway 392 and an unauthenticated API Management (APIM) executed by the hosting device 312 or one or more separate hosting devices. Further, the third zone 360 includes a static content device 364, which can be part of the hosting device 312, that stores static content 361, and the fourth zone 380 includes a CSDMZ gateway 382 executed by the hosting device 312, one or more separate hosting devices, or a privacy computing device 396. Finally, the fifth zone 390 includes a privacy portal 397 executed by the privacy computing device 396.

FIG. 3 depicts submitting and receiving a privacy data request, thus corresponding to what happens before the confirm stage in FIG. 4. The networked computing system 300 allows user 301 to submit a request for privacy data, such as PII, to the privacy portal 397. In some examples, the user 301 can edit and/or delete their privacy data maintained by the privacy portal 397. For example, as illustrated, a user 301 enters a webpage address 303 of a web-based privacy request form, such as the privacy data request webpage 270, into the internet browser 322 of the user device 310. In response, the internet browser 322 requests static content 325 for the privacy request form from the hosting device 312. If the request 325 satisfies the policies and/or requirements of the WAF 324 (i.e., the request 325 is not blocked by the executed WAF 324), the hosting device 312 sends a first static content request message 331 that includes the request for static content to the application gateway 392 of the second zone 340.

The application gateway 392 receives the first static content request message 331, and routes the first static content request message 331 to the static content device 364 of the third zone 360. The static content device 364 receives the first static content request message 331 and, based on the first static content request message 331, determines static content 361 corresponding to the web-based privacy request form. As described herein, the static content 361 can include any static data such as images, infographics, and static information, among other examples.

Further, the static content device 364 generates a static content message 362 that includes the static content 361. The static content device 364 then transmits the static content message 362 to the application gateway 392 in the second zone 340. The application gateway 392 receives the static content message 362, and routes the static content message 362 to the hosting device 312 in the first zone 320. The hosting device 312 extracts the static content 361 from the static content message 362, and transmits the static content 361 to the executed internet browser 322 for display. The executed internet browser 322 can then display the privacy request form, including the static content 361, to the user 301.

The user 301 can enter privacy data request 305 into various fields of the privacy request form and, once complete, can select a "SUBMIT" icon to cause the executed browser 322 to transmit the privacy data request 305 to the hosting device 312.

The hosting device 312 verifies the privacy data request 305 under the security policy associated with the WAF. In response to confirm compliance with that security policy, the hosting device 312 generates a privacy data message 373 that includes the privacy data request 305. The hosting device 312 then transmits the privacy data message 373 to the application gateway 392 of the second zone 340.

The application gateway 392 receives privacy data message 373, and routes the privacy data message 373 to the APIM 346. The APIM 346 extracts the privacy data request 305 from the privacy data message 373 and verifies the privacy request data against the security policy associated with the APIM. In response to confirming compliance with this security policy, the APIM 346 sends a privacy request message 347 that includes the privacy data request 305 to the CSDMZ gateway 382 in the fourth zone 380.

The CSDMZ gateway 382 accepts the privacy request message 347 when it satisfies the security policy associated with the CSDMZ. The CSDMZ gateway 382 extracts the privacy data request 305 from the privacy request message 347, and sends the privacy data request 305 to the privacy portal 397 executed by the privacy computing device 396. Once received by the privacy portal 397, the privacy data request 305 has been successfully submitted and is further processed for execution. The privacy portal 397 then handles the API calls with respect to private, backend databases and services, including calls to verify user identity. For example, and in response to an API call to verify a user's identity, the privacy portal 397 can request user information for the user from one or databases, and can verify the user based on the requested user information.

In some embodiments, as result of receiving a privacy data request, the system is programmed to carry out the confirm stage and handle resulting API calls in the verify stage illustrated in FIG. 4. As discussed above, an email with an activation link could be sent to the user device 120 in the verify stage, which causes the user device 120 to transmit a selection of the activation link as a new user request. The new user request will similarly be processed through the data processing pipeline to conclude the verify stage. As the processing reaches the privacy portal, the privacy portal is programmed to then handle the API calls with respect to the private, backend databases and services, including calls to collect and verify user privacy data. For example, and as described herein, the privacy portal 397 can request user privacy data from one or databases, and can aggregate the information received for the user. The privacy portal can then transmit the aggregated information in response to the privacy data request 305. The system thus handles the resulting API calls in the collect stage within the cloud computer cluster 110, carry out the review stage, and initiate the complete stage.

Figure 7:
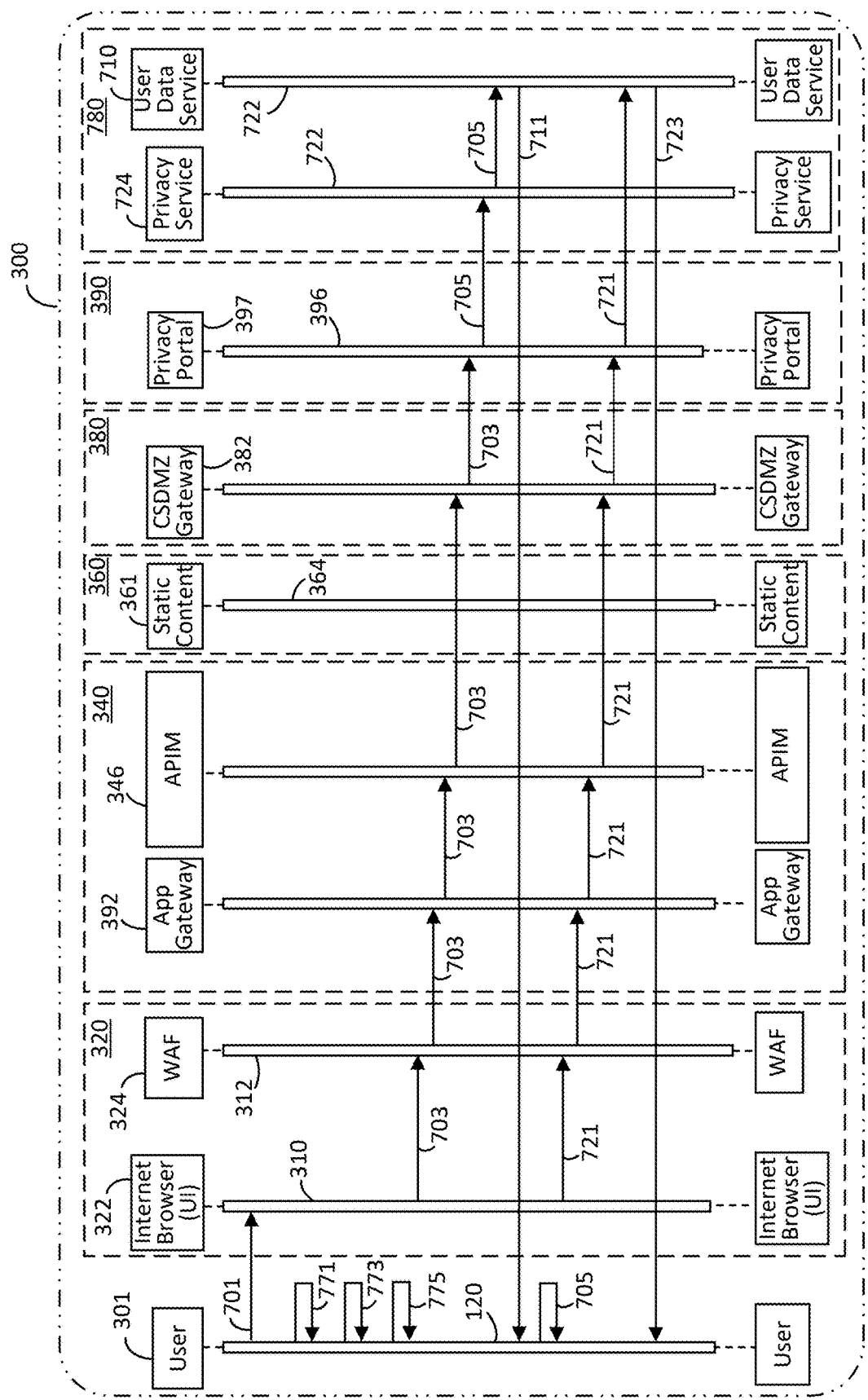
FIG. 7 illustrates example report transmission operations, in accordance with some embodiments.

FIG. 7 illustrates example report transmission operations within the networked computing system 300. FIG. 7 depicts transmitting and receiving a response to the privacy data request, which can correspond to operations that take place in the complete stage illustrated in FIG. 4. In this example, the user device 120 detects the selection of a report link 701, and transmits the selection as a first new user request 703 that, for instance, was transmitted by the cloud computing network 110 (e.g., networked processing device 112C) in a privacy data response message 243. For instance, the privacy data response message 243 can include the report link, as well as privacy data encrypted/encoded or otherwise associated with a passcode.

The hosting device 312 is programmed to process the first new user request 703 by WAF 324. Assuming the first new user request 703 is not blocked by the WAF 324, the hosting device 312 transmits the first new user request 703 or a corresponding internal request to the APIM 346 via the application gateway 392.

Further, assuming that the APIM 346 determines that the first new user request is in compliance with a corresponding security policy, the APIM 346 transmits the new user request 703 to the CSDMZ gateway 382. Assuming that the first new user request is not blocked by the CSDMZ gateway 382, the CSDMZ gateway 382 sends the first new user request 703 to the privacy portal 397 executed by the privacy computing device 396. Based on receiving first new user request 703 through the privacy portal 397, the privacy computing device 396 generates a passcode 705. For example, the privacy computing device 396 can generate the passcode 705 randomly, based on an IP or MAC address of the privacy request activation message 703, based on a pseudo-random algorithm, or using any other suitable method. In some examples, the passcode 705 is unique to the corresponding user. The privacy computing device 396 transmits the passcode 70 to a privacy service 724 executed by a privacy server 722 in a sixth zone 780, which can be part of the fifth zone comprising private, backend databases and services.

The privacy service 724 can store the passcode 705 in memory and further transmit the passcode 705 to a user data service 710 executed by the privacy computing device 396. The user data service 710 can, in response to receiving the passcode 705, generate a passcode message 711 that includes the passcode 705. Further, the user data service 710 can transmit the passcode message 711 to the user device 310 in the first zone 320. The privacy service 724 can also directly generate and transmit the passcode message 771.

The user device 310 can display the passcode message 711, which includes the passcode 705, to the user 301 using the executed browser 322.

If the user attempts to access the privacy data of the privacy data response message 243, the user can be presented with a passcode request 771 (e.g., a password request icon) for inputting the passcode. If the user enters the wrong passcode, the passcode request fails 773, and the user can be requested to retry 775. If, however, the user enters the passcode 705 that was received in the passcode message 711, the executed browser 322 generates a download report request 721, and transmits the download report request 721 to hosting device 312 where it is processed by WAF 324. Assuming the download report request 721 is not blocked by the WAF 324, the hosting device 312 transmits the download report request 721 to the APIM 346 via the application gateway 392.

Further, assuming the download report request 721 is not blocked by the APIM 346, the hosting device 312 transmits the download report request 721 to the CSDMZ gateway 382. Assuming the download report request 721 is not blocked by the CSDMZ gateway 382, the CSDMZ gateway 382 sends the download report request 721 to the privacy portal 397 executed by the privacy computing device 396. Based on receiving the download report request 721 through the privacy portal 397, the privacy computing device 396 transmits the download report request 721 to the user data service 710 executed by the privacy server 722 in the sixth zone 780.

The user data service 710 can, in response to receiving the download report request 721, generate a report response message 723 that includes the user's requested data (e.g., privacy data, PII, etc.). Further, the user data service 710 can transmit the report response message 723 to the user device 310 in the first zone 320. The user device 310 can display the report response message 723, which includes the user's requested data, to the user 301 using the executed browser 322.

In some embodiments, as the processing reaches the privacy portal, the privacy portal is programmed to then handle the API calls with respect to the private, backend databases and services, including calls to generate and verify user passcode or process a report download request. For example, as described herein, the privacy portal can collect user information from one or more databases, and can verify the user based on the collected information. In addition, the privacy portal can be used the collected information to generate a response to a report download request. The system thus handles the resulting API calls in the complete stage within the cloud computer cluster 110. When the final report or a result of processing the initial privacy data request is downloaded, the complete stage illustrated in FIG. 4 is complete. In other embodiments, one or more stages illustrated in FIG. 4 could skipped, or certain processing performed in one stage could be skipped or performed in another stage instead.

4. Example Processes

Figure 5:
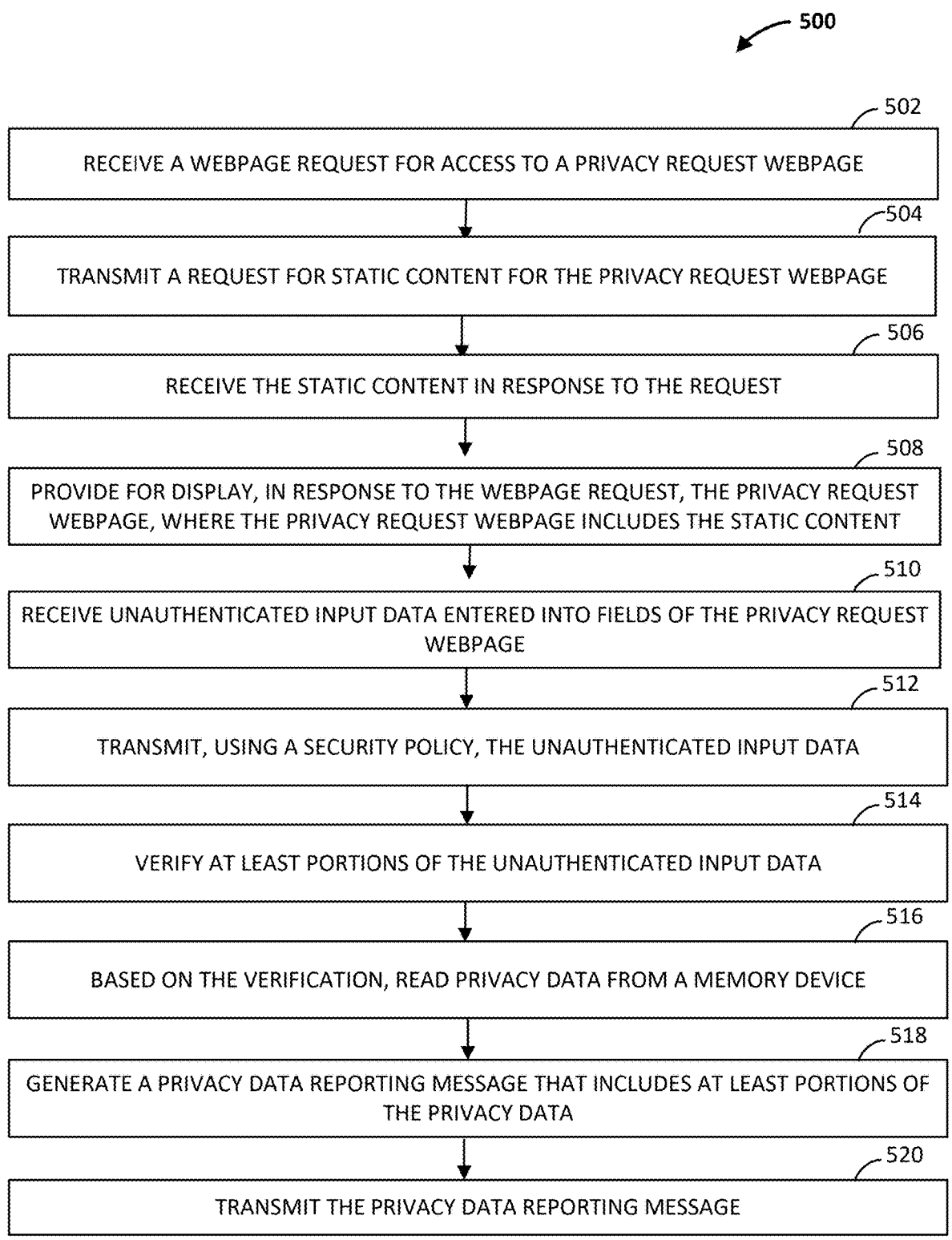
FIG. 5 illustrates an example method for generating privacy data reporting messages in response to privacy data requests, in accordance with some embodiments.

FIG. 5 illustrates an example process 500 for generating privacy data reporting messages in response to privacy data requests. The process 500 can be carried out by, for example, the Request processing device 130 of FIG. 1. FIG. 5 is shown in simplified, schematic format for purposes of illustrating a clear example and other embodiments can include more, fewer, or different elements connected in various manners. FIG. 5 is intended to disclose an algorithm, plan, or outline that can be used to implement one or more computer programs or other software elements which, when executed, can cause the performing of one or more of the functional improvements and technical advances that are described herein. Furthermore, the flow diagrams herein are described at the same level of detail that persons of ordinary skill in the art ordinarily use to communicate with one another about algorithms, plans, or specifications forming a basis of software programs that they plan to code or implement using their accumulated skill and knowledge.

At block 502, a webpage request for access to a privacy request webpage is received. For example, as described herein, the Request processing device 130 can receive a webpage request 201 from the privacy data requesting device 150. At block 504, a request for static content for the privacy request webpage is generated and transmitted (e.g., to the application service 251 of the request processing device 130). Further, at block 506, the static content is received in response to the request. At block 508, the privacy request webpage is provided for display in response to the webpage request. The privacy request webpage includes the static content.

Proceeding to block 510, unauthenticated input data that is entered into fields of the privacy request webpage is received. For example, the unauthenticated data can include data entered in the various fields of the privacy data request webpage 270. At block 512, the unauthenticated data is transmitted (e.g., to the CS DMZ gateway 289). In some examples, the unauthenticated data is transmitted in accordance with a security policy.

At block 514, at least portions of the unauthenticated input data are verified (e.g., by the networked processing device 112A via the CS DMZ gateway 289). For instance, and as described herein, the networked processing device 112A can compare the portions of the unauthenticated input data to stored user data to determine if there is a match. If the portions of the unauthenticated input data match to privacy data for a particular user, the portions of the unauthenticated input data are determined to be verified. Based on the verification, at block 516, privacy data for the requesting user is read from a memory device. For instance, the networked processing device 112A can read user privacy data 117 for the user from the database 116. At block 518, a privacy data reporting message is generated (e.g., by the networked processing device 112A), and includes at least portions of the read privacy data and, at block 520, transmits the privacy data reporting message. As described herein, the privacy data reporting message can be an email addressed to an address of the requesting user.

Figure 6:
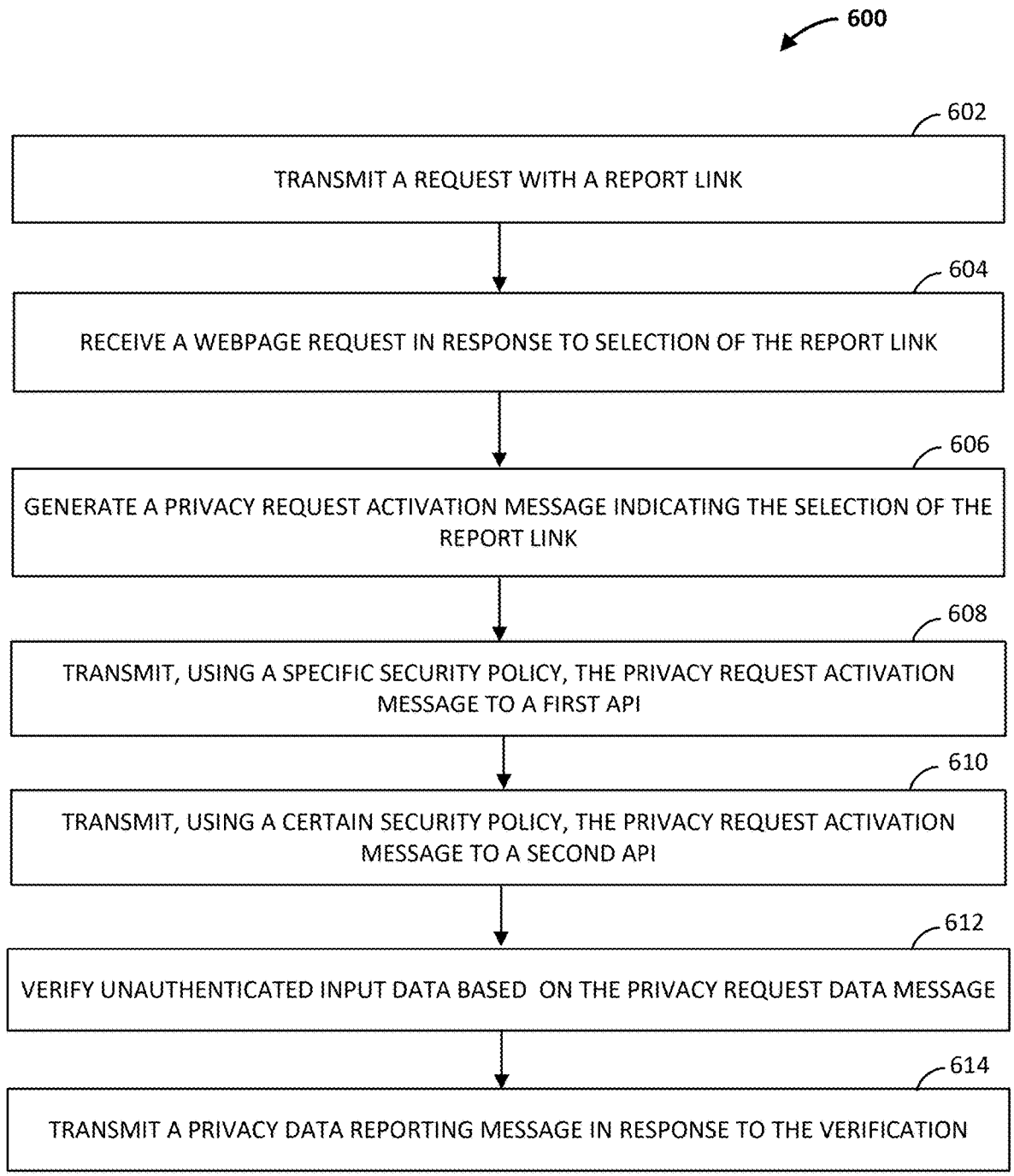
FIG. 6 illustrates an example method for transmitting a privacy data reporting message in response to a verified data request, in accordance with some embodiments.

FIG. 6 illustrates an example process 600 to transmit a privacy data reporting message in response to a verified data request. The process 600 can be carried out by, for example, the request processing device 130 of FIG. 1. FIG. 6 is shown in simplified, schematic format for purposes of illustrating a clear example and other embodiments can include more, fewer, or different elements connected in various manners. FIG. 6 is intended to disclose an algorithm, plan, or outline that can be used to implement one or more computer programs or other software elements which, when executed, can cause the performing of one or more of the functional improvements and technical advances that are described herein.

At block 602, a request with a report link is transmitted. For example, the request processing device 130 can transmit the request to an email address of a user, which can be viewed on an executed browser of the privacy data requesting device 150 or user device 120. At block 604, a webpage request is received in response to the selection of the report link. For instance, in response to the user selecting the report link, a webpage request (e.g., HTTP Request) is generated and transmitted by the user device 120, and is received by the request processing device 130.

At block 606, the Request processing device 130 generates a privacy request activation message indicating the selection of the report link and, at block 608, transmits the privacy request activation message to a first API. For instance, the request processing device 130 can transmit the privacy request activation message to the API 208B of the APIM 272 via the application gateway 233. The privacy request activation message can be transmitted using a specific security policy. Further, and at block 610, the privacy request activation message is transmitted to a second API. For example, the APIM 272 can transmit the privacy request activation message to the privacy portal 327 executed by the by the networked processing device 112A via the CS DMZ gateway 289. The privacy request activation message can be transmitted using a certain security policy that can differ from the specific security policy.

At block 612, unauthenticated input data is verified based on the received privacy request data message. The unauthenticated input data could have been initially received from a requesting user, causing the transmission of the report link request of block 602, for instance. Further, at block 614, a privacy data reporting message is generated and transmitted in response to the verification. As described herein, the privacy data reporting message can be an e-mail with a report link, such as the report link referred to above with respect to FIG. 5.

Figure 8:
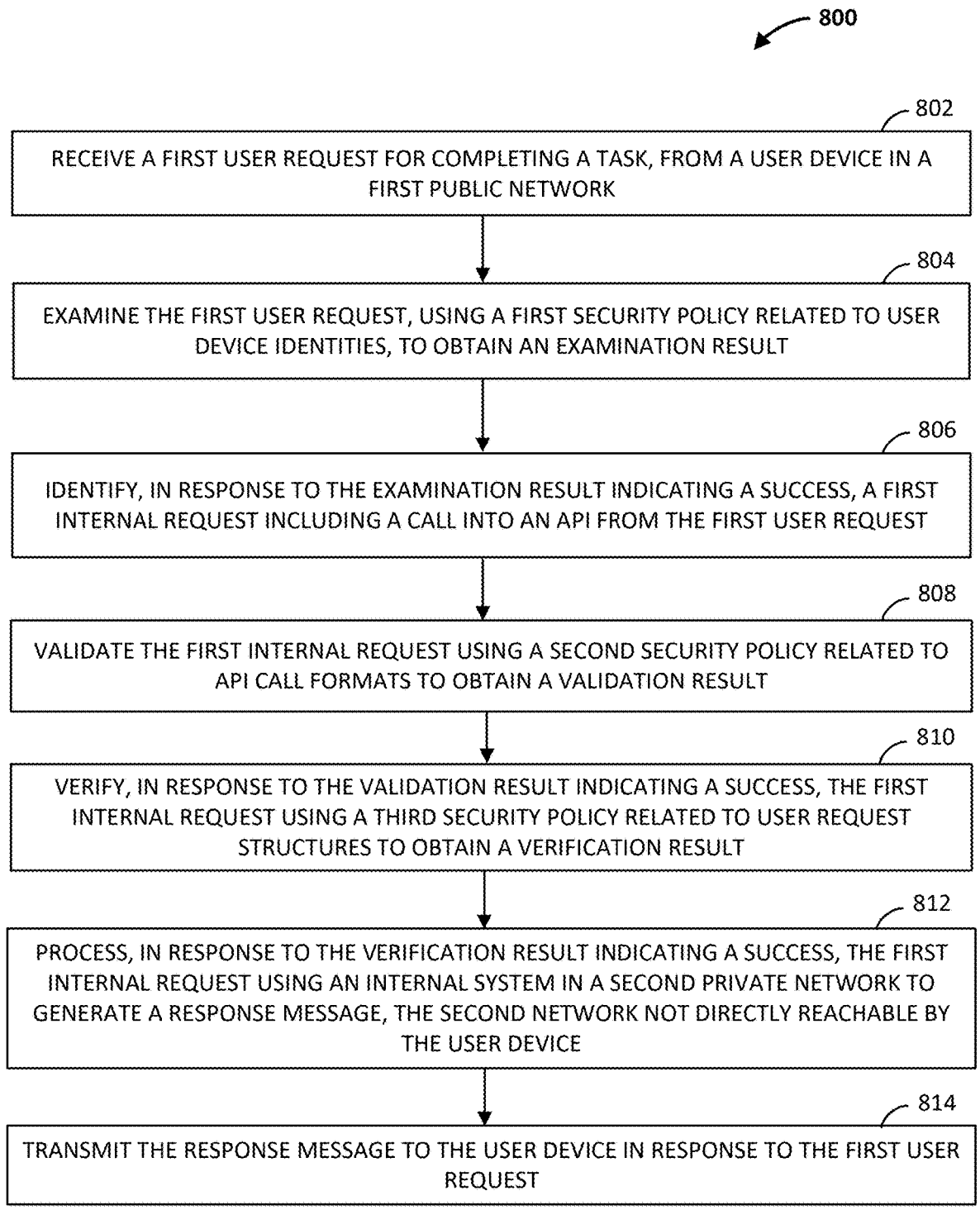
FIG. 8 illustrates an example process to service requests associated with unauthenticated users in a distributed computing environment, in accordance with some embodiments.

FIG. 8 illustrates an example process 800 to service requests associated with unauthenticated users in a distributed computing environment. The process 800 can be carried out by, for example, the request processing device 130 of FIG. 1. FIG. 8 is shown in simplified, schematic format for purposes of illustrating a clear example and other embodiments can include more, fewer, or different elements connected in various manners. FIG. 8 is intended to disclose an algorithm, plan, or outline that can be used to implement one or more computer programs or other software elements which, when executed, can cause the performing of one or more of the functional improvements and technical advances that are described herein.

At block 802, a first user request for completing a task is received from a user device in a first public network. For example, the first user request can be webpage request for access to a webpage. The task can include, for instance, viewing, updating, adding, deleting, or changing access permissions of personal information of an individual. At block 804, the first user request is examined using a first security policy related to user device identities to obtain an examination result. For example, the webpage request can be examined using the first security policy to obtain an initial examination result. In some embodiments, the examination includes judging whether the first user request includes a bot attack or another cyberattack by coming from an untrusted web address or performing SQL injection, cross-site scripting, cross-site request forgery, or file inclusion attacks.

Further, at block 806, a first internal request is identified in response to the examination result indicating a success. The first internal request includes a call into an API from the first user request. At block 808, the first internal request is validated using a second security policy related to API call formats to obtain a validation result. In some embodiments, a header field of the first internal request is compared to an expected header value, and the first internal request is validated based on the comparison. In some embodiments, the first internal request is compared to an API schema for the API in terms of at least parameter formats and paths, and the first internal request is successfully validated based on the comparison.

In some embodiments, user data is extracted from the first internal request. The user data is compared with expected data to obtain a comparison result. In response to the comparison result indicating a success, a verification message is generated and transmitted to the user device based on the user data with an activation link.

In some embodiments, in response to the initial examination result indicating a success, a second internal request for static content is identified. In addition, the static content is received in response to the second internal request. In response to the webpage request, an interactive webpage, including the static content, is displayed. The static content can include an image or HTML code. The first user request described above is based on input data entered via the interactive webpage. In some embodiments, a token is generated and transmitted in response to the second internal request. In response to the examination result indicating a success, the first internal request is validated using the token.

At block 810, in response to the validation result indicating a success, the first internal request is verified to obtain a verification result. The first internal request is verified using a third security policy related to user request structures. In some embodiments, the first user request includes input data entered into fields of an interactive webpage, where the verifying includes comparing the first internal request against a structure of the interactive webpage.

Further, at block 812, the first internal request is processed in response to the verification result indicating a success. The first internal request is processed using an internal system in a second private network to generate a response message, where the second network is not directly reachable by the user device. In some embodiments, the processing includes reading user privacy data from a memory device. For example, the response message can include at least portions of the privacy data. At block 814, the response message is transmitted to the user device in response to the first user request. In some embodiments, the processing includes reading user privacy data from a memory device, and includes at least portions of the privacy data in the response message.

In some embodiments, a download link is transmitted to the user device before receiving the first user request, where the first user request is for obtaining a passcode. In addition, the response message includes the passcode.

In some embodiments, a second user request for downloading a report of processing the first user request is received from the user device. The second user request is examined using the first security policy to obtain a second examination result. In response to the second examination result indicating a success, a second internal request is identified. The second internal request includes a call into the API to obtain the report. The second internal request is validated using a predetermined token and the second security policy to obtain a second validation result. In response to the second validation result indicating a success, the second internal request is verified using the third security policy to obtain a second verification result. In response to the second verification result indicating a success, the second internal request is processed using the internal system in the second private network to obtain the report. A second response message, including the report, is transmitted to the user device.

In some embodiments, database queries are generated for user data for a plurality of databases based on the call into the API. The database queries are transmitted to the plurality of databases. In response to the database queries, the response queries are received. The report is then generated based on the user data, and the response message is generated to include the report. In some embodiments, duplicate database entries in the user data are determined, and the duplicate entries are eliminated from the report. In some embodiments, one or more portions of the user data are masked in the report under a specific security policy. For example, one or more digits of a social security number can be masked from the report.

5. Example Implementation

According to one embodiment, the techniques described herein are implemented by at least one computing device. The techniques may be implemented in whole or in part using a combination of at least one server computer and/or other computing devices that are coupled using a network, such as a packet data network. The computing devices may be hard-wired to perform the techniques, or may include digital electronic devices such as at least one application-specific integrated circuit (ASIC) or field programmable gate array (FPGA) that is persistently programmed to perform the techniques, or may include at least one general purpose hardware processor programmed to perform the techniques pursuant to program instructions in firmware, memory, other storage, or a combination. Such computing devices may also combine custom hard-wired logic, ASICs, or FPGAs with custom programming to accomplish the described techniques. The computing devices may be server computers, workstations, personal computers, portable computer systems, handheld devices, mobile computing devices, wearable devices, body mounted or implantable devices, smartphones, smart appliances, internetworking devices, autonomous or semi-autonomous devices such as robots or unmanned ground or aerial vehicles, any other electronic device that incorporates hard-wired and/or program logic to implement the described techniques, one or more virtual computing machines or instances in a data center, and/or a network of server computers and/or personal computers.

Figure 9:
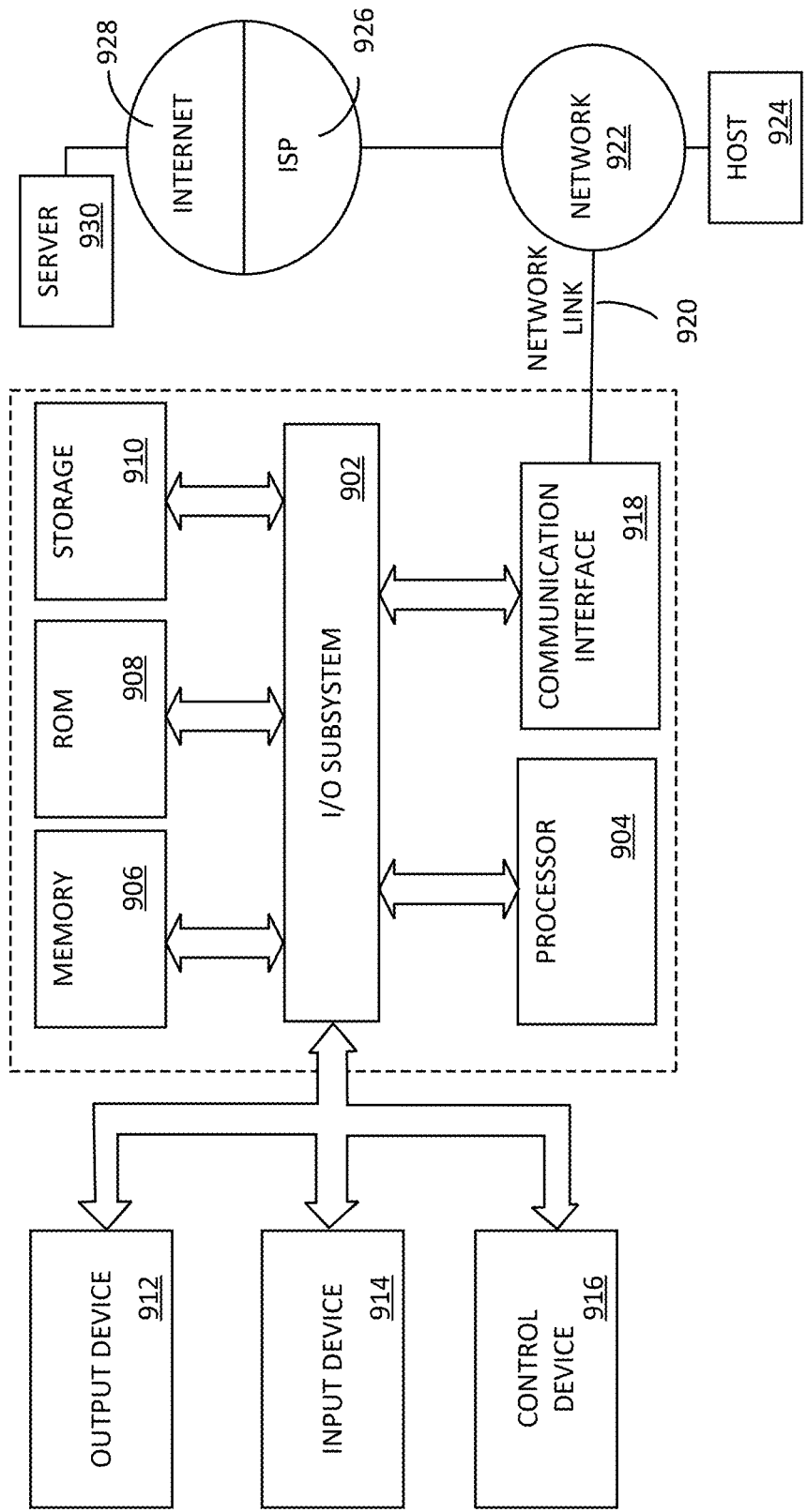
FIG. 9 illustrates a computer system upon which various embodiments may be implemented.

FIG. 9 is a block diagram that illustrates an example computer system with which an embodiment may be implemented. In the example of FIG. 9, a computer system 900 and instructions for implementing the disclosed technologies in hardware, software, or a combination of hardware and software, are represented schematically, for example as boxes and circles, at the same level of detail that is commonly used by persons of ordinary skill in the art to which this disclosure pertains for communicating about computer architecture and computer systems implementations.

Computer system 900 includes an input/output (I/O) subsystem 902 which may include a bus and/or other communication mechanism(s) for communicating information and/or instructions between the components of the computer system 900 over electronic signal paths. The I/O subsystem 902 may include an I/O controller, a memory controller and at least one I/O port. The electronic signal paths are represented schematically in the drawings, for example as lines, unidirectional arrows, or bidirectional arrows.

At least one hardware processor 904 is coupled to I/O subsystem 902 for processing information and instructions. Hardware processor 904 may include, for example, a general-purpose microprocessor or microcontroller and/or a special-purpose microprocessor such as an embedded system or a graphics processing unit (GPU) or a digital signal processor or ARM processor. Processor 904 may comprise an integrated arithmetic logic unit (ALU) or may be coupled to a separate ALU.

Computer system 900 includes one or more units of memory 906, such as a main memory, which is coupled to I/O subsystem 902 for electronically digitally storing data and instructions to be executed by processor 904. Memory 906 may include volatile memory such as various forms of random-access memory (RAM) or other dynamic storage device. Memory 906 also may be used for storing temporary variables or other intermediate information during execution of instructions to be executed by processor 904. Such instructions, when stored in non-transitory computer-readable storage media accessible to processor 904, can render computer system 900 into a special-purpose machine that is customized to perform the operations specified in the instructions.

Computer system 900 further includes non-volatile memory such as read only memory (ROM) 908 or other static storage device coupled to I/O subsystem 902 for storing information and instructions for processor 904. The ROM 908 may include various forms of programmable ROM (PROM) such as erasable PROM (EPROM) or electrically erasable PROM (EEPROM). A unit of persistent storage 910 may include various forms of non-volatile RAM (NVRAM), such as FLASH memory, or solid-state storage, magnetic disk, or optical disk such as CD-ROM or DVD-ROM, and may be coupled to I/O subsystem 902 for storing information and instructions. Storage 910 is an example of a non-transitory computer-readable medium that may be used to store instructions and data which when executed by the processor 904 cause performing computer-implemented methods to execute the techniques herein.

The instructions in memory 906, ROM 908 or storage 910 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement Transmission Control Protocol/Internet Protocol (TCP/IP), Hypertext Transfer Protocol (HTTP) or other communication protocols; file processing instructions to interpret and render files coded using HTML, Extensible Markup Language (XML), Joint Photographic Experts Group (JPEG), Moving Picture Experts Group (MPEG) or Portable Network Graphics (PNG); user interface instructions to render or interpret commands for a GUI, command-line interface or text user interface; application software such as an office suite, internet access applications, design and manufacturing applications, graphics applications, audio applications, software engineering applications, educational applications, games or miscellaneous applications. The instructions may implement a web server, web application server or web client. The instructions may be organized as a presentation layer, application layer and data storage layer such as a relational database system using structured query language (SQL) or NoSQL, an object store, a graph database, a flat file system or other data storage.

Computer system 900 may be coupled via I/O subsystem 902 to at least one output device 912. In one embodiment, output device 912 is a digital computer display. Examples of a display that may be used in various embodiments include a touch screen display or a light-emitting diode (LED) display or a liquid crystal display (LCD) or an e-paper display. Computer system 900 may include other type(s) of output devices 912, alternatively or in addition to a display device. Examples of other output devices 912 include printers, ticket printers, plotters, projectors, sound cards or video cards, speakers, buzzers or piezoelectric devices or other audible devices, lamps or LED or LCD indicators, haptic devices, actuators, or servos.

At least one input device 914 is coupled to I/O subsystem 902 for communicating signals, data, command selections or gestures to processor 904. Examples of input devices 914 include touch screens, microphones, still and video digital cameras, alphanumeric and other keys, keypads, keyboards, graphics tablets, image scanners, joysticks, clocks, switches, buttons, dials, slides, and/or various types of sensors such as force sensors, motion sensors, heat sensors, accelerometers, gyroscopes, and inertial measurement unit (IMU) sensors and/or various types of transceivers such as wireless, such as cellular or Wi-Fi, radio frequency (RF) or infrared (IR) transceivers and Global Positioning System (GPS) transceivers.

Another type of input device is a control device 916, which may perform cursor control or other automated control functions such as navigation in a graphical interface on a display screen, alternatively or in addition to input functions. Control device 916 may be a touchpad, a mouse, a trackball, or cursor direction keys for communicating direction information and command selections to processor 904 and for controlling cursor movement on the output device 912. The input device may have at least two degrees of freedom in two axes, a first axis (e.g., x) and a second axis (e.g., y), that allows the device to specify positions in a plane. Another type of input device is a wired, wireless, or optical control device such as a joystick, wand, console, steering wheel, pedal, gearshift mechanism or other type of control device. An input device 914 may include a combination of multiple different input devices, such as a video camera and a depth sensor.

In another embodiment, computer system 900 may comprise an internet of things (IoT) device in which one or more of the output device 912, input device 914, and control device 916 are omitted. Or, in such an embodiment, the input device 914 may comprise one or more cameras, motion detectors, thermometers, microphones, seismic detectors, other sensors or detectors, measurement devices or encoders and the output device 912 may comprise a special-purpose display such as a single-line LED or LCD display, one or more indicators, a display panel, a meter, a valve, a solenoid, an actuator or a servo.

When computer system 900 is a mobile computing device, input device 914 may comprise a global positioning system (GPS) receiver coupled to a GPS module that is capable of triangulating to a plurality of GPS satellites, determining and generating geo-location or position data such as latitude-longitude values for a geophysical location of the computer system 900. Output device 912 may include hardware, software, firmware, and interfaces for generating position reporting packets, notifications, pulse or heartbeat signals, or other recurring data transmissions that specify a position of the computer system 900, alone or in combination with other application-specific data, directed toward host computer 924 or server 930.

Computer system 900 may implement the techniques described herein using customized hard-wired logic, at least one ASIC or FPGA, firmware and/or program instructions or logic which when loaded and used or executed in combination with the computer system causes or programs the computer system to operate as a special-purpose machine.

According to one embodiment, the techniques herein are performed by computer system 900 in response to processor 904 executing at least one sequence of at least one instruction contained in main memory 906. Such instructions may be read into main memory 906 from another storage medium, such as storage 910. Execution of the sequences of instructions contained in main memory 906 causes processor 904 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage 910. Volatile media includes dynamic memory, such as memory 906. Common forms of storage media include, for example, a hard disk, solid state drive, flash drive, magnetic data storage medium, any optical or physical data storage medium, memory chip, or the like.

Storage media is distinct from but may be used in conjunction with transmission media. Transmission media participates in transferring information between storage media. For example, transmission media includes coaxial cables, copper wire and fiber optics, including the wires that comprise a bus of I/O subsystem 902. Transmission media can also take the form of acoustic or light waves, such as those generated during radio-wave and infra-red data communications.

Various forms of media may be involved in carrying at least one sequence of at least one instruction to processor 904 for execution. For example, the instructions may initially be carried on a magnetic disk or solid-state drive of a remote computer. The remote computer can load the instructions into its dynamic memory and send the instructions over a communication link such as a fiber optic or coaxial cable or telephone line using a modem. A modem or router local to computer system 900 can receive the data on the communication link and convert the data to be read by computer system 900. For instance, a receiver such as a radio frequency antenna or an infrared detector can receive the data carried in a wireless or optical signal and appropriate circuitry can provide the data to I/O subsystem 902 such as place the data on a bus. I/O subsystem 902 carries the data to memory 906, from which processor 904 retrieves and executes the instructions. The instructions received by memory 906 may optionally be stored on storage 910 either before or after execution by processor 904.

Computer system 900 also includes a communication interface 918 coupled to I/O subsystem 902. Communication interface 918 provides a two-way data communication coupling to network link(s) 920 that are directly or indirectly connected to at least one communication network, such as a network 922 or a public or private cloud on the Internet. For example, communication interface 918 may be an Ethernet networking interface, integrated-services digital network (ISDN) card, cable modem, satellite modem, or a modem to provide a data communication connection to a corresponding type of communications line, for example an Ethernet cable or a metal cable of any kind or a fiber-optic line or a telephone line. Network 922 broadly represents a LAN, WAN, campus network, internetwork, or any combination thereof. Communication interface 918 may comprise a LAN card to provide a data communication connection to a compatible LAN, or a cellular radiotelephone interface that is wired to send or receive cellular data according to cellular radiotelephone wireless networking standards, or a satellite radio interface that is wired to send or receive digital data according to satellite wireless networking standards. In any such implementation, communication interface 918 sends and receives electrical, electromagnetic, or optical signals over signal paths that carry digital data streams representing various types of information.

Network link 920 typically provides electrical, electromagnetic, or optical data communication directly or through at least one network to other data devices, using, for example, satellite, cellular, Wi-Fi, or BLUETOOTH technology. For example, network link 920 may provide a connection through a network 922 to a host computer 924.

Furthermore, network link 920 may provide a connection through network 922 or to other computing devices via internetworking devices and/or computers that are operated by an Internet Service Provider (ISP) 926. ISP 926 provides data communication services through a world-wide packet data communication network represented as internet 928. A server 930 may be coupled to internet 928. Server 930 broadly represents any computer, data center, virtual machine, or virtual computing instance with or without a hypervisor, or computer executing a containerized program system such as DOCKER or KUBERNETES. Server 930 may represent an electronic digital service that is implemented using more than one computer or instance and that is accessed and used by transmitting web services requests, uniform resource locator (URL) strings with parameters in HTTP payloads, application programming interface (API) calls, app services calls, or other service calls. Computer system 900 and server 930 may form elements of a distributed computing system that includes other computers, a processing cluster, server farm or other organization of computers that cooperate to perform tasks or execute applications or services. Server 930 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to interpret or render files coded using HTML, XML, JPEG, MPEG or PNG; user interface instructions to render or interpret commands for a GUI, command-line interface or text user interface; application software such as an office suite, internet access applications, design and manufacturing applications, graphics applications, audio applications, software engineering applications, educational applications, games or miscellaneous applications. Server 930 may comprise a web application server that hosts a presentation layer, application layer and data storage layer such as a relational database system using structured query language (SQL) or NoSQL, an object store, a graph database, a flat file system or other data storage.

Computer system 900 can send messages and receive data and instructions, including program code, through the network(s), network link 920 and communication interface 918. In the Internet example, a server 930 might transmit a requested code for an application program through Internet 928, ISP 926, local network 922 and communication interface 918. The received code may be executed by processor 904 as it is received, and/or stored in storage 910, or other non-volatile storage for later execution.

The execution of instructions as described in this section may implement a process in the form of an instance of a computer program that is being executed, and consisting of program code and its current activity. Depending on the operating system (OS), a process may be made up of multiple threads of execution that execute instructions concurrently. In this context, a computer program is a passive collection of instructions, while a process may be the actual execution of those instructions. Several processes may be associated with the same program; for example, opening up several instances of the same program often means more than one process is being executed. Multitasking may be implemented to allow multiple processes to share processor 904. While each processor 904 or core of the processor executes a single task at a time, computer system 900 may be programmed to implement multitasking to allow each processor to switch between tasks that are being executed without having to wait for each task to finish. In an embodiment, switches may be performed when tasks perform input/output operations, when a task indicates that it can be switched, or on hardware interrupts. Time-sharing may be implemented to allow fast response for interactive user applications by rapidly performing context switches to provide the appearance of concurrent execution of multiple processes simultaneously. In an embodiment, for security and reliability, an operating system may prevent direct communication between independent processes, providing strictly mediated and controlled inter-process communication functionality.

6. Extensions and Alternatives

In the foregoing specification, embodiments of the disclosure have been described with reference to numerous specific details that may vary from implementation to implementation. The specification and drawings are, accordingly, to be regarded in an illustrative rather than a restrictive sense. The sole and exclusive indicator of the scope of the disclosure, and what is intended by the applicants to be the scope of the disclosure, is the literal and equivalent scope of the set of claims that issue from this application, in the specific form in which such claims issue, including any subsequent correction.

What is claimed is:

1. A method for servicing requests associated with unauthenticated users and user devices in a distributed computing environment, the method performed by one or more processors and comprising:
receiving, in a first public network, a first user request for completing a task through a Web interface, from an unauthenticated user device in the first public network;
examining, in the first public network, the first user request, using a first security policy to obtain an examination result,
the first security policy determining whether to accept or reject the first user request based on an identity of the user device;
identifying, in response to the examination result indicating a success and in the first public network, a first internal request including a call into a private application programming interface (API) associated with a second private network from the first user request and validating the first internal request using a second security policy to obtain a validation result,
the second security policy determining whether a format of the call complies with a specification of the private API;
verifying, in response to the validation result indicating a success, the first user request using a third security policy to obtain a verification result,
the third security policy determining whether a structure of the first user request complies with a schema of the Web interface;
processing, in response to the verification result indicating a success, the first internal request using an internal system in the second private network to generate a response message related to the task, the second private network not directly reachable by the user device; and
transmitting the response message to the user device in response to the first user request.

2. The method of claim 1, further comprising:
receiving a webpage request for access to a webpage;
examining the webpage request, using the first security policy, to obtain an initial examination result;
identifying, in response to the initial examination result indicating a success, a second internal request for static content;
receiving the static content in response to the second internal request; and
providing for display, in response to the webpage request, an interactive webpage including the static content, the first user request being based on input data entered via the interactive webpage.

3. The method of claim 2, further comprising:
generating and transmitting a token in response to the second internal request; and
in response to the examination result indicating a success, validating the first internal request using the token.

4. The method of claim 1,
the first user request including input data entered into fields of an interactive webpage,
the processing comprising reading user privacy data from a memory device, and
including at least portions of the privacy data in the response message.

5. The method of claim 1, the processing comprising:
extracting user data from the first internal request;
comparing the user data with expected data to obtain a comparison result; and
in response to the comparison result indicating a success, generating and transmitting a verification message to the user device based on the user data with an activation link.

6. The method of claim 1, further comprising:
receiving a second user request for downloading a report of processing the first user request from the user devices;
examining the second user request, using the first security policy, to obtain a second examination result;
identifying, in response to the second examination result indicating a success, a second internal request including a call into the private API to obtain the report;
validating the second internal request using a predetermined token and the second security policy to obtain a second validation result;
verifying, in response to the second validation result indicating a success, the second internal request using the third security policy to obtain a second verification result;
processing, in response to the second verification result indicating a success, the second internal request using the internal system in the second private network to obtain the report; and transmitting a second response message including the report to the user device.

7. The method of claim 2, wherein the static content includes at least one image or HTML code.

8. The method of claim 1, wherein validating the first internal request using the second security policy related to API calls comprises comparing a header field of the first internal request to an expected header value, and validating the first internal request based on the comparison.

9. The method of claim 1, further comprising:
transmitting a download link to the user device before receiving the first user request,
the first user request being for obtaining a passcode, and
the response message including the passcode.

10. The method of claim 1, the processing comprising:
generating database queries for user data for a plurality of databases based on the call into the private API;
transmitting the database queries to the plurality of databases;
receiving the user data in response to the database queries;
generating a report based on the user data; and
generating the response message to include the report.

11. The method of claim 10, the processing further comprising:
determining duplicate database entries in the user data; and
eliminating the duplicate entries from the report.

12. The method of claim 11, the processing further comprising masking one or more portions of the user data in the report under a specific security policy.

13. The method of claim 1, wherein validating the first internal request using the second security policy related to API call formats comprises comparing the first internal request to an API schema for the private API in terms of at least parameter formats and paths, and successfully validating the first internal request based on the comparison.

14. The method of claim 1, the examining comprising judging whether the first user request includes a bot attack or another cyberattack by coming from an untrusted web address or performing SQL injection, cross-site scripting, cross-site request forgery, or file inclusion attacks.

15. The method of claim 1, the first user request including input data entered into fields of an interactive webpage, the verifying comprising comparing the first internal request against a structure of the interactive webpage.

16. The method of claim 1, the task including viewing, updating, adding, deleting, or changing access permissions of personal information of an individual.

17. A non-transitory, computer-readable storage medium storing one or more sequences of instructions which when executed cause one or more processors to perform:
receiving, in a first public network, a first user request for completing a task through a Web interface, from an unauthenticated user device in the first public network;
examining, in the first public network, the first user request using a first security policy to obtain an examination result,
the first security policy determining whether to accept or reject the first user request based on an identity of the user device;
identifying, in response to the examination result indicating a success and in the first public network, a first internal request including a call into a private application programming interface (API) associated with a second private network from the first user request and validating the first internal request using a second security policy to obtain a validation result,
the second security policy determining whether a format of the call complies with a specification of the private API;
verifying, in response to the validation result indicating a success, the first user request using a third security policy to obtain a verification result,
the third security policy determining whether a structure of the first user request complies with a schema of the Web interface;
processing, in response to the verification result indicating a success, the first internal request using an internal system in the second private network to generate a response message related to the task, the second private network not directly reachable by the user device; and
transmitting the response message to the user device in response to the first user request.

18. The non-transitory, computer-readable storage medium of claim 17, wherein the instructions which when executed cause the one or more processors to perform:
receiving a webpage request for access to a webpage;
examining the webpage request, using the first security policy, to obtain an initial examination result;
identifying, in response to the initial examination result indicating a success, a second internal request for static content;
receiving the static content in response to the second internal request; and
providing for display, in response to the webpage request, an interactive webpage including the static content, the first user request being based on data entered via the interactive webpage.

19. A system for distributing tasks in a distributed computing environment, comprising:
a memory; and
at least one processor communicatively coupled to the memory, the at least one processor configured to perform:
receiving, in a first public network, a first user request for completing a task through a Web interface, from an unauthenticated user device in the first public network;
examining, in the first public network, the first user request; using a first security policy to obtain an examination result,
the first security policy determining whether to accept or reject the first user request based on an identity of the user device;
identifying, in response to the examination result indicating a success and in the first public network, a first internal request including a call into a private application programming interface (API) associated with a second private network from the first user request and validating the first internal request using a second security policy to obtain a validation result,
the second security policy determining whether a format of the call complies with a specification of the private API;
verifying, in response to the validation result indicating a success, the first user request using a third security policy to obtain a verification result,
the third security policy determining whether a structure of the first user request complies with a schema of the Web interface;
processing, in response to the verification result indicating a success, the first internal request using an internal system in the second private network to generate a response message related to the task, the second private network not directly reachable by the user device; and transmitting the response message to the user device in response to the first user request.

20. The system of claim 19, wherein the at least one processor is configured to perform:
receiving a webpage request for access to a webpage;
examining the webpage request, using the first security policy, to obtain an initial examination result;
identifying, in response to the initial examination result indicating a success, a second internal request for static content;
receiving the static content in response to the second internal request; and
providing for display, in response to the webpage request, an interactive webpage including the static content, the first user request being based on data entered via the interactive webpage.

* * * * *